(12) United States Patent
Byrne

(10) Patent No.: US 7,465,178 B2
(45) Date of Patent: Dec. 16, 2008

(54) RACEWAY WITH MULTI-POSITIONABLE RECEPTACLE BLOCKS

(76) Inventor: Norman R. Byrne, 2736 Honey Creek NE., Ada, MI (US) 49301

( * ) Notice: Subject to any disclaimer, the term of this patent is extended or adjusted under 35 U.S.C. 154(b) by 0 days.

(21) Appl. No.: 11/913,477

(22) PCT Filed: May 4, 2006

(86) PCT No.: PCT/US2006/017321

§ 371 (c)(1),
(2), (4) Date: Nov. 2, 2007

(87) PCT Pub. No.: WO2007/027243

PCT Pub. Date: Mar. 8, 2007

(65) Prior Publication Data

US 2008/0188106 A1 Aug. 7, 2008

Related U.S. Application Data

(60) Provisional application No. 60/677,496, filed on May 4, 2005.

(51) Int. Cl.
*H01R 4/60* (2006.01)
(52) U.S. Cl. ..................................................... 439/215
(58) Field of Classification Search ................ 439/215, 439/654, 207–213, 717
See application file for complete search history.

(56) References Cited

U.S. PATENT DOCUMENTS

| | | | | |
|---|---|---|---|---|
| 5,178,555 A * | 1/1993 | Kilpatrick et al. | ............ | 439/215 |
| 5,941,720 A * | 8/1999 | Byrne | ......................... | 439/215 |
| 6,036,516 A * | 3/2000 | Byrne | ......................... | 439/215 |
| 6,491,535 B1 * | 12/2002 | Buse | ............................ | 439/215 |
| 6,575,777 B2 * | 6/2003 | Henriott et al. | ............... | 439/215 |
| 7,114,972 B1 * | 10/2006 | Riner | ......................... | 439/215 |
| 7,294,005 B1 * | 11/2007 | Laukhuf | ...................... | 439/215 |
| 2002/0137381 A1 * | 9/2002 | Chapman et al. | ............ | 439/215 |
| 2004/0053527 A1 * | 3/2004 | Kondas | ...................... | 439/215 |
| 2004/0102072 A1 * | 5/2004 | Plattner et al. | ............... | 439/215 |
| 2005/0009393 A1 * | 1/2005 | Kondas et al. | ............... | 439/215 |
| 2005/0095890 A1 * | 5/2005 | Plattner et al. | ............... | 439/215 |
| 2006/0024996 A1 * | 2/2006 | Johnson et al. | ............... | 439/215 |
| 2007/0087603 A1 * | 4/2007 | Riner | ......................... | 439/215 |
| 2007/0259548 A1 * | 11/2007 | Byrne | ......................... | 439/215 |
| 2008/0032534 A1 * | 2/2008 | Laukhuf | ...................... | 439/215 |

* cited by examiner

*Primary Examiner*—Neil Abrams
*Assistant Examiner*—Harshad C Patel
(74) *Attorney, Agent, or Firm*—Varnum, Riddering, Schmidt & Howlett LLP

(57) ABSTRACT

A raceway system (500) includes a junction block (502) having a housing (503). The housing (503) includes a first recessed area (520) having lower receptacle channels (576) and upper receptacle channels (578). An electrical receptacle block (542) includes a lower tab (580) and an upper tab (582) which selectively engage one of each of the lower receptacle channels (576) and upper receptacle channels (578). The selective engagement determines how far laterally outward the receptacle block (542) extends, relative to the junction block (502).

1 Claim, 20 Drawing Sheets

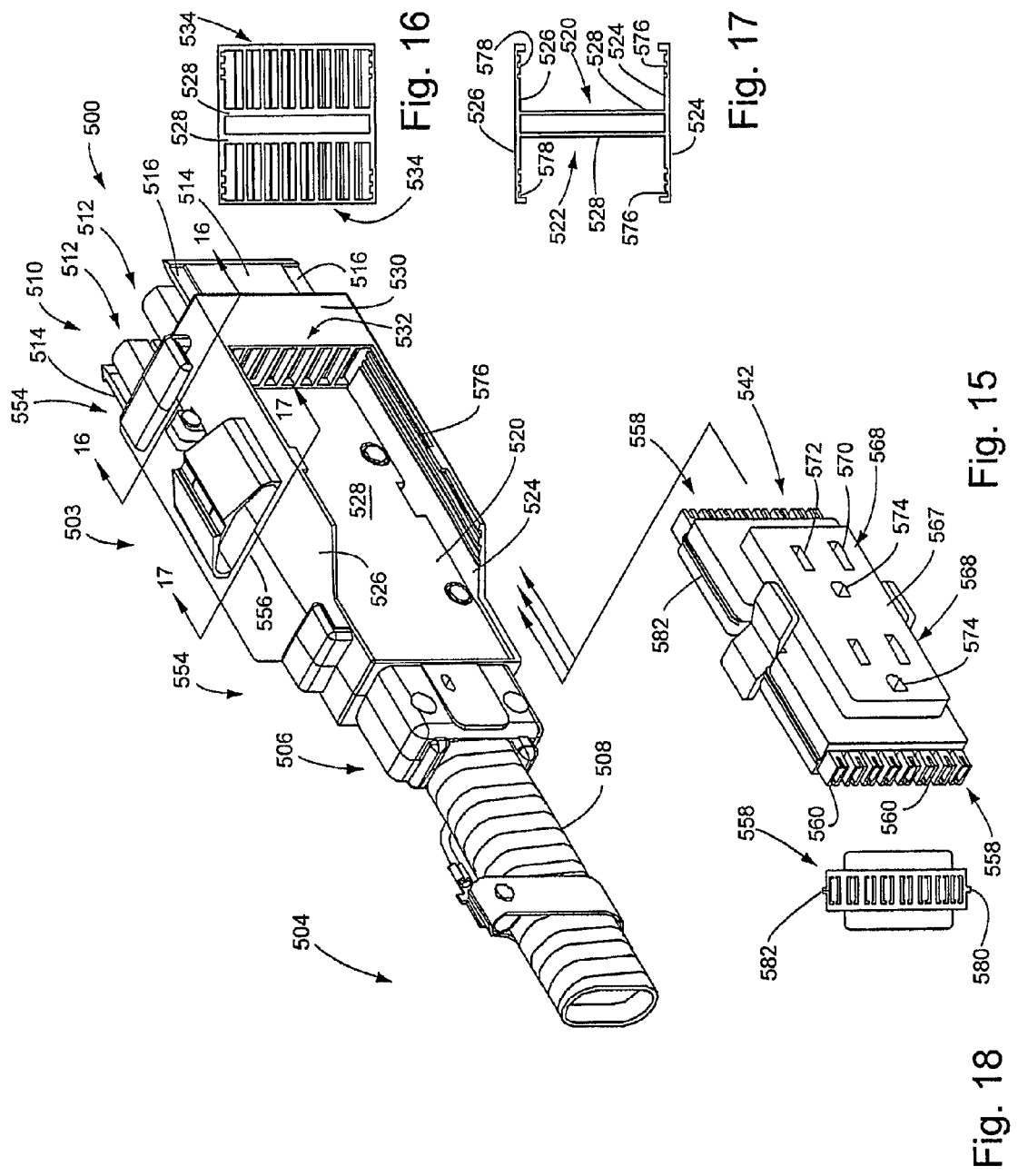

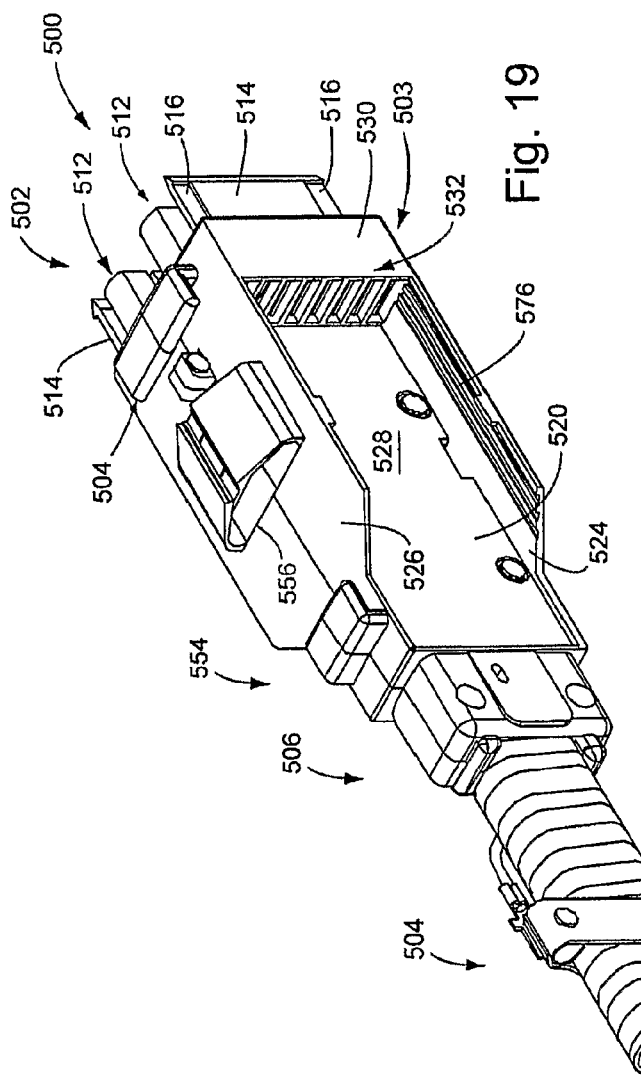
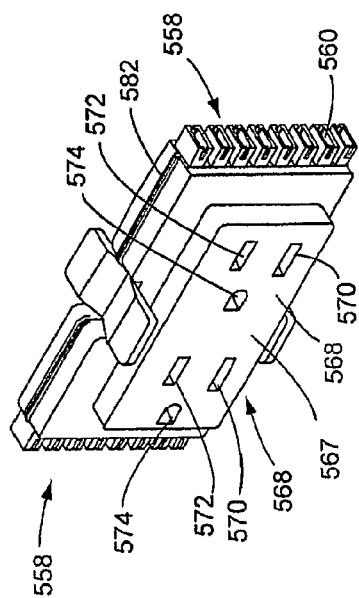

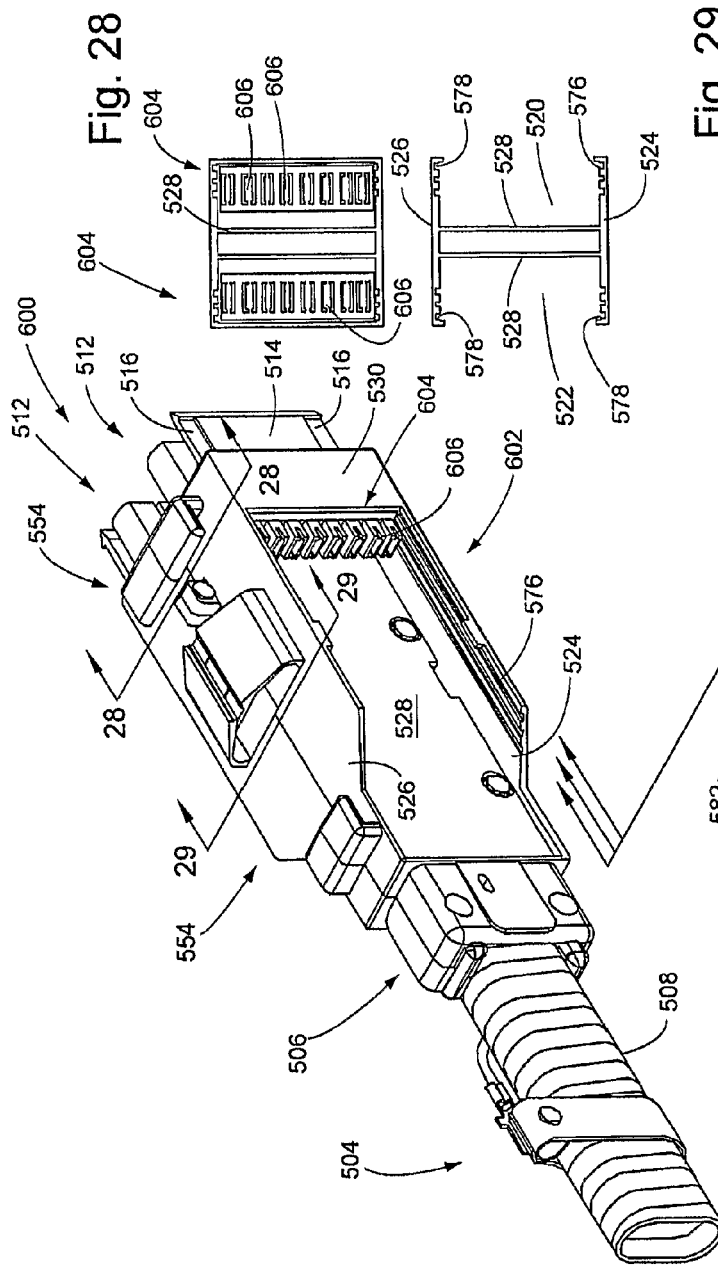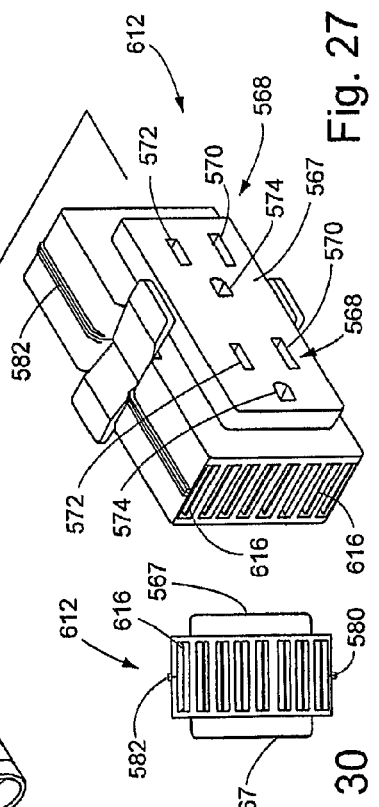

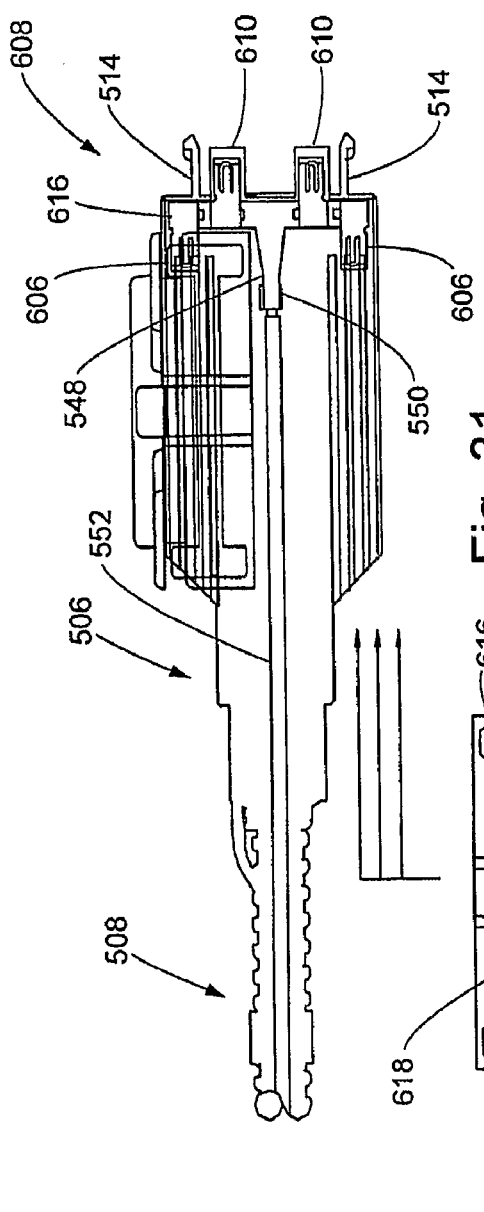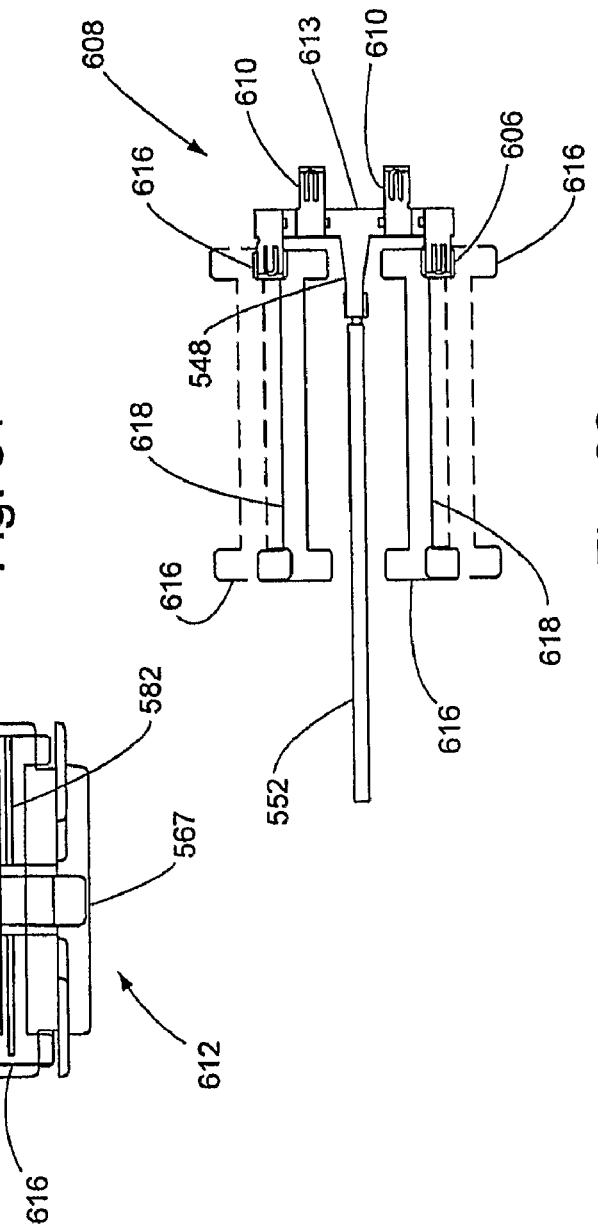

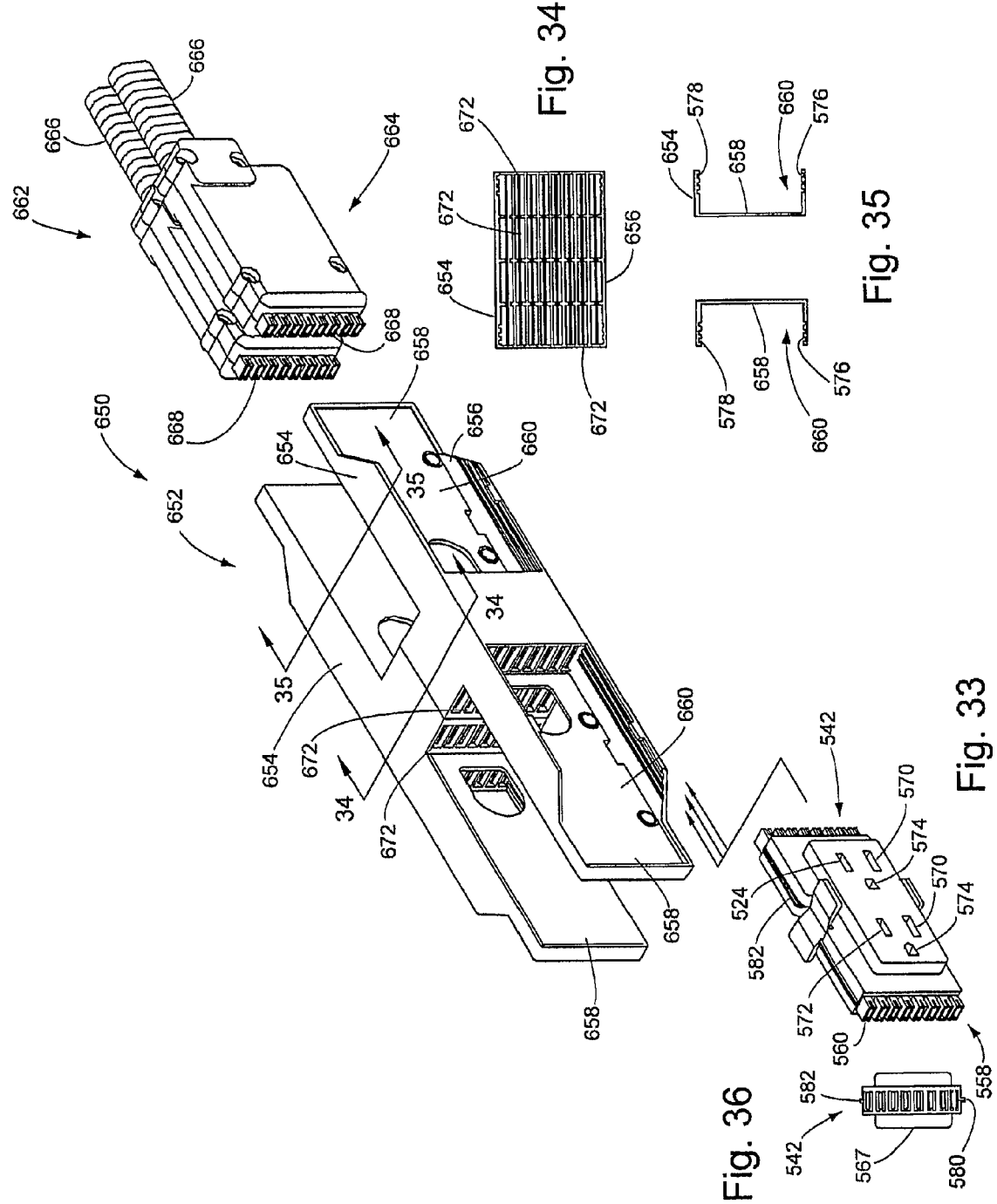

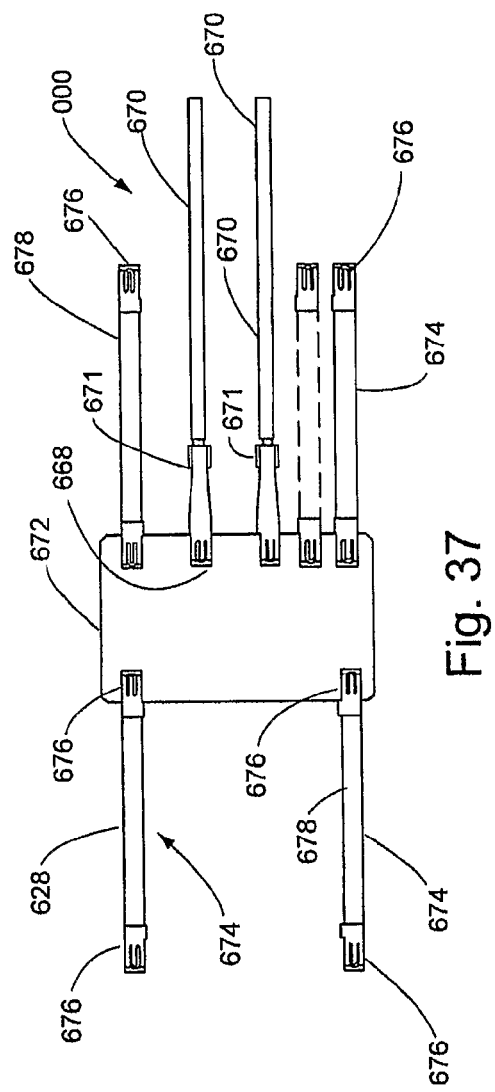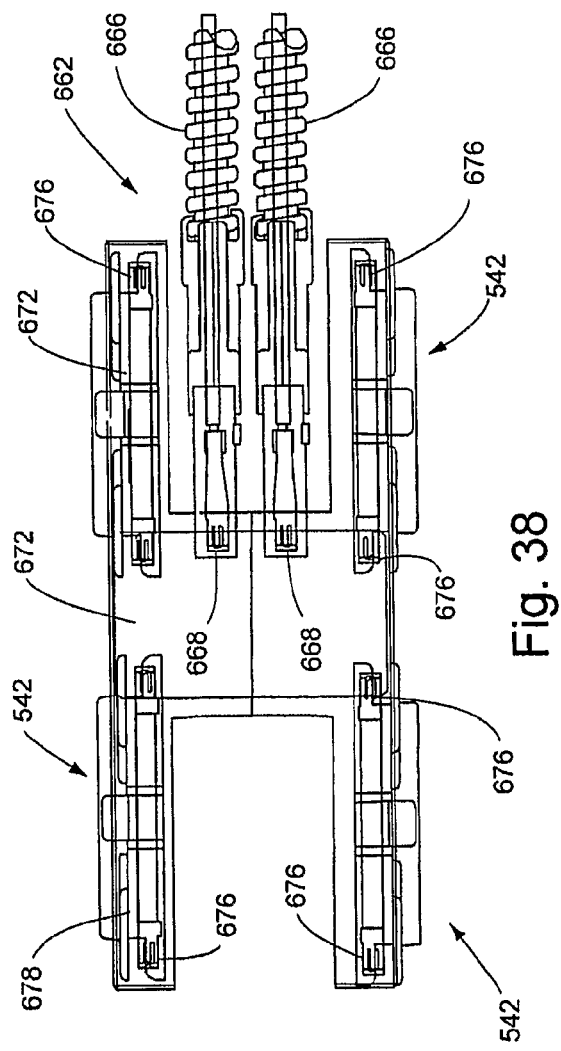

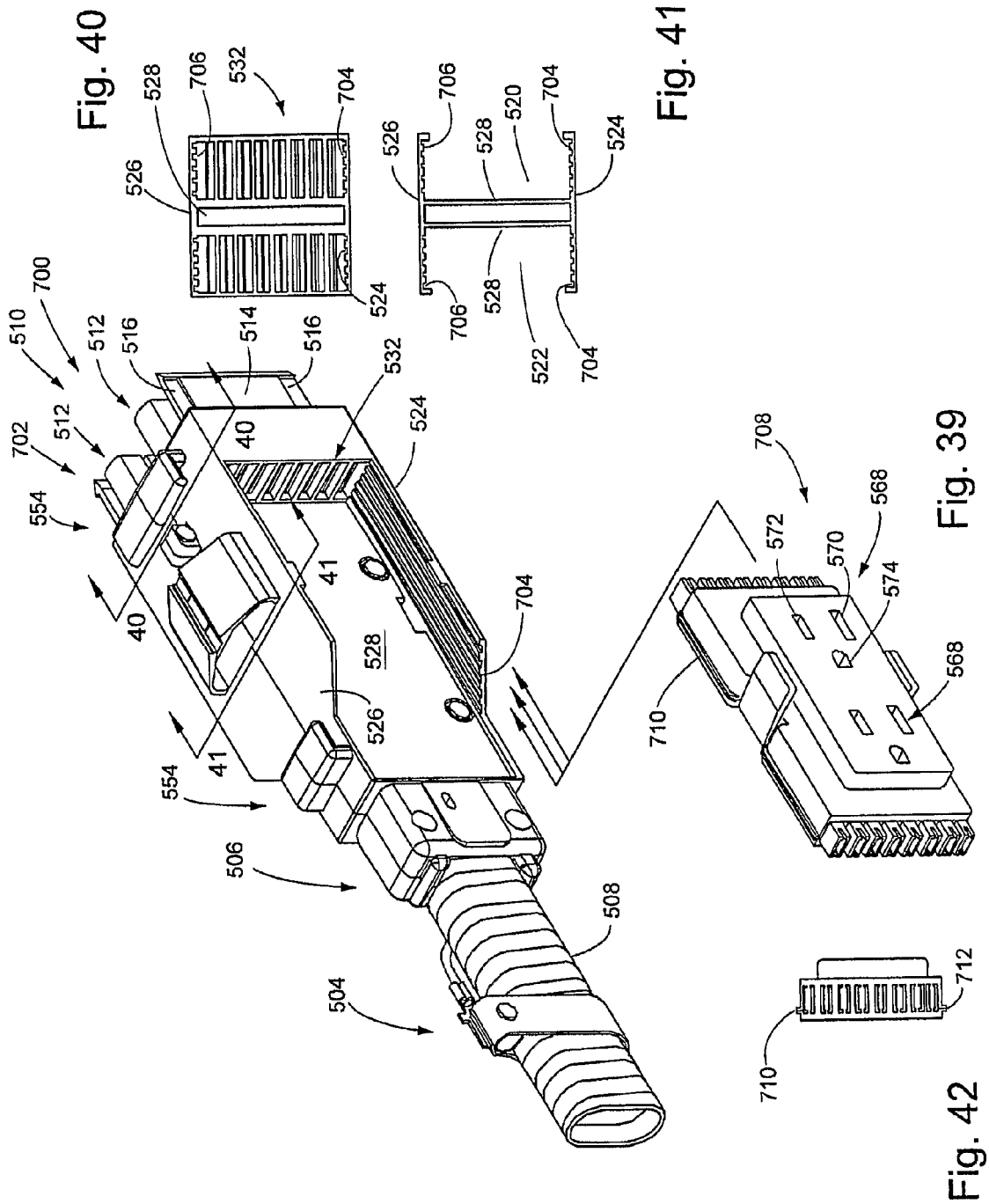

RACEWAY WITH MULTI-POSITIONABLE RECEPTACLE BLOCKS

CROSS-REFERENCE TO RELATED APPLICATIONS

This international patent application claims priority of U.S. Provisional Patent Application Ser. No. 60/677,496, filed May 4, 2005.

STATEMENT REGARDING FEDERALLY SPONSORED RESEARCH OR DEVELOPMENT

Not applicable.

REFERENCE TO MICROFISHE APPENDIX

Not applicable.

BACKGROUND OF THE INVENTION

1. Field of the Invention

The invention relates to electrical power and communications distribution systems and, more particularly, to systems having raceway locations which may be of differing widths.

2. Background Art

Known interior wall systems typically employ pre-fabricated modular units. These units are often joined together in various configurations, so as to divide a workplace into smaller offices or work areas. Generally, such modular wall panels may be equipped with means for receiving general building power and, possibly, general communications. Such building power may, for example, be conventional AC power received either under floor or from relatively permanent walls or the like. In various types of environments comprising electrical equipment, or wherein electrical apparatus are otherwise employed, interconnections of electrical components to incoming utility power are typically provided by means of cables or wires. For example, in office systems compromising modular furniture components, it is often necessary to provide electrical interconnections between incoming power supplies and various types of electrical devices typically used in an office environment, such as electric typewriters, lamps, etc. Computer-related devices, such as video display terminals and similar peripherals, are also now commonly employed in various office and industrial environments.

One advantage inherent in modular office systems is the capability to rearrange furniture components as necessitated by changes in space requirements, resulting from changes in the number of personnel and other business-related considerations. However, these modular systems must not only allow for change in furniture configurations, but also must provide for convenient interconnection of electrical devices to utility power, regardless of the spacial configuration of the modular systems and resultant variable distances between electrical devices.

In providing the interconnection of electrical apparatus and power inputs, it is necessary to include an arrangement for feeding the incoming utility power to the power outlets. In stationary structures, such as conventional industrial buildings and the like, a substantial amount of room would normally exist behind stationary walls and other areas in which to provide the requisite cabling for interconnecting incoming utility power to electrical receptacles mounted in the walls. Such systems, however, can be designed so as to remain stationary throughout their lifetime, without requiring general changes in the office or industrial environment areas.

In addition to receiving electrical power from the general incoming building power supply, modular office systems typically require communications connections for office equipment such as telephones, internet communications and the like. The problems associated with providing distribution of communications essentially correspond to the same problems existing with respect to distribution of conventional electrical power.

In this regard, it is known to provide modular wall panels with areas characterized as raceways. Often, these raceways are located along bottom edges of modular panels. The raceways are adapted to house electrical cabling and electrical junction blocks. The cabling and junction blocks are utilized to provide electrical outlets and electrical power connections to adjacent panels. However, it is also apparent that to the extent reference is made herein to providing electrical outlets and electrical power connections for adjacent panels, the same issues exist with respect to providing communications among panels.

Still further, it is known that the raceway of one modular wall unit may be provided with a male connector at one end, and a female connector at another end. Pairs of junction blocks, each provided with electrical outlets, made to be disposed at spaced-apart positions along the raceway. Conduits may be extended between the junction blocks and between the connectors in the junction blocks. In this manner, electrical interconnection is provided between the units.

The modular panels of a space-divider may be configured, such that adjacent panels are in a straight line, or at various angular positions relative to each other. It is common to configure intersecting walls in such a fashion that three or four modular wall panels may intersect at right angles. Each of the panels typically requires electrical outlets, and may require outlets on both sides of the panels. In any event, electrical power has to be provided to all of the panels, and often only one of the panels at the multiple panel junction is connected to a power supply source. Under such circumstances, the interconnecting wiring becomes a significant problem. That is, special modifications may have to be made to power systems of wall panels to be used in such a configuration. Because interchangeability of wall panels is highly desirable, custom modifications are preferably avoided. Still further, modifications of wall panels on site at the installation facility is complex and may be relatively expensive.

In addition to the foregoing issues, problems can arise with respect to the use of junction blocks and the amount of room which may exist within a raceway. That is, raceways require sufficient room so as to provide for junction blocks, electrical outlet receptacle blocks, and cabling extending between junction blocks and between adjacent panels.

One example of a prior art system is illustrated in Propst's, et al., U.S. Pat. No. 4,382,648 issued May 10, 1983. In the Propst, et al. system, mating connectors of opposing panels are engaged when the panels are aligned in a straight line. When the panels are positioned in an intersecting relationship, specially manufactured couplers are utilized. One type of special coupler is used when the panels are positioned at right angles. Another type is used with adjoining panels arranged at angles other than right angles. Consequently, costly inventory of couplers must be maintained. The Propst, et al. system uses a double set of connectors comprising a male and female connector for each conductor to be interconnected. When a single one of these prior art panels intersects two adjacent panels, one of the specially manufactured couplers connects the female terminals to one of the adjacent panels, and another of the couplers connects the male terminals to the adjacent panel.

A further system is disclosed in Driscoll, U.S. Pat. No. 4,135,775, issued Jan. 23, 1979. In the Driscoll system, each panel is provided with an electrical outlet box in its raceway. Panels of different widths are provided with a pair of female connectors. Outlet boxes of adjacent panels are interconnected by means of flexible cables having male connectors at both ends. When three or four panels are adjoined in an intersecting arrangement, two cables may be connected the pair of female connectors at one end of an outlet box. In this manner, connection of two adjacent panels is facilitated.

With respect to both of the foregoing systems, and other than in the special intersecting relationship, one half of the double set of terminals of these systems is superfluous. There is a distinct disadvantage in modern day systems, where several independent electrical circuits are needed in a wall panel system, with each requiring separate connectors. Space for such circuits and their connectors is very limited in the raceway areas of modem, thin-line wall panels.

Other systems also exist with respect to electrical connectors, junction boxes, and the like. For example, Rodrigues, U.S. Pat. No. 1,187,010 issued Jun. 13, 1916, discloses a detachable and interchangeable electrical switch plug adapted for use in connection with various electrically heated appliances. A clamping device is positioned in a fixed, but detachable relationship to one end of the plug. Means are provided to enclose and prevent sharp flexure of the cord comprising a flexible enclosing tube gripped under tension by the other end of the clamping device. The plug and the clamping device may be simultaneously removed from the socket.

Finizie, U.S. Pat. No. 2,540,575, issued Feb. 6, 1951, discloses a cord guide member for utensil plugs. The concept is to reduce wear on the cord and the connector plug, and to provide a connection which will withstand heavy pulling strains without injury. Strain relief is also provided. A sectional body is equipped anteriorally adjacent one end of the body with terminals. The other end of the body contains an anterior chamber or socket. A pivotable cord-guiding member having a pivot member is movably mounted in the socket. A wedge-shaped strain relief insert is received within a wedge-shaped recess in the pivot member. A cord extends into the pivot member and includes wires passing from the cord toward the terminals. The incoming portions of the wires are moved around the insert and firmly wedged within the recess.

Byrne, U.S. Pat. No. 4,551,577, issued Nov. 5, 1985, describes a retractable power center. The power center provides for conveniently located electrical power source receptacles adapted to be mounted on a work surface. In one embodiment, the power center includes a rectangular housing received within a slot in a work surface. A clamping arrangement is utilized to secure the housing to the work surface. A lower extrusion is connected to the lower portion of the housing. A movable power carriage mounts the receptacles and a catch assembly releasably maintains a carriage in a closed and retracted position. In response to manual activation, the catch assembly is released and springs tensioned between the carriage and the extrusion exert forces so as to extend the carriage upward into an extended, open position. In the open position, the user can energize the desired electrical devices from the receptacles, and then lower the carriage into the retracted position.

Byrne, U.S. Pat. No. 4,959,021, issued Sep. 25, 1990, discloses a pivotable power feed connector having a pivotal connector adapted to be connected to a flexible conduit or cable. The cable has a series of conductors extending there through. The connector is pivotably connected to a block assembly through which the conductors extend. The block assembly, in turn, is connectable to a contact block, with the conductors conductively connected to a set of prong terminals extending outwardly from the block. A cover is secured over the block so as to prevent the prong terminals from being exposed during assembly and disassembly.

The cover automatically exposes the prong terminals as the power feed connector is moved into engagement with a receptacle in a modular office panel. The connector allows the conduit or cable to be swiveled to an arc of approximately 180 degrees to any desired position. The connector is also manually removable from interconnection with the block assembly. Such removal allows the conduit or cable to be pulled back from the conductors and cut to a desired length. The connector includes a power feed cover which can be utilized in part to maintain the connector in either of two spatial configurations relative to the block assembly.

Nienhuis, et al., U.S. Pat. No. 5,013,252, issued May 7, 1991, discloses an electrified wall panel system having a power distribution server located within a wall panel unit. The server includes four receptacle module ports oriented in an h-shaped configuration. A first receptacle port is located on the first side of the wall panel unit and opens toward a first end of the unit. A second receptacle unit is also located on the first side of the wall panel unit, and opens toward a second end of the wall panel unit. A third receptacle port and a second sided wall panel unit opens toward the first end of the wall panel unit, while correspondingly, a fourth receptacle port on the second side of the wall panel unit opens toward the second end of the wall panel unit. First and second harnesses are each electrically connected at first ends thereof to the power distribution server. They extend to opposite ends of the wall paneled unit and include connector ports on the second ends thereof for providing electrical interconnection of adjacent wall panel units. The Nienhuis, et al. patent also discloses a system with a wall panel connector interchangeably usable with the interconnection of two, three or four units. The connector includes a hook member for connecting together adjacent vertical members of frames of adjacent wall panel units at a lower portion thereof. A draw naught for connecting together adjacent vertical members of frames of adjacent wall panel units and an odd proportion thereof is provided by vertical displacement thereof.

Lincoln, et al., U.S. Pat. No. 5,073,120, issued Dec. 17, 1991, discloses a power distribution assembly having a bussing distribution connector. The connector includes a series of bus terminals positioned within an electrically insulative housing. A series of electrical terminals are positioned in the housing for distributing more than one electrical circuit. At least one ground terminal, one neutral terminal, and three hot terminals are provided. A grounding shell partially surrounds the bus connector and includes a grounding tab grounding the one ground terminal to the metallic grounding shell. In another embodiment, two bus connectors are interconnected together, so as to provide for an increased number of output ports.

Byrne, U.S. Pat. No. 5,096,431, issued Mar. 17, 1992, discloses an outlet receptacle with rearrangeable terminals. The receptacle is provided with input terminals to selected positions, for engagement with terminals of an electrical junction block. The block includes a series of terminals representing a plurality of different electrical circuits. The receptacle block has neutral, ground and positive flexible positive conductor bars electrically connected to neutral, ground and positive electrical terminals. Input terminals of the block are formed integral with the flexible conductor bars and levers are provided for moving the terminal ends of the conductor bars to physically different positions. In one configuration, the receptacle block housing is provided with openings at opposing ends, and the flexible conductor bars have terminal ends controlled by levers at both ends of the outlet receptacle block. In another configuration, the block has output terminals in a front wall, and the input terminals of the receptacle block are formed as ends of the flexible bars and extend at an approximately 90 degree angle to the bars. They further send through openings in the back wall of the outlet receptacle for engagement with terminals of a junction block. Levers are provided in the back wall of the receptacle block for positioning the terminal ends in alignment with different terminals of the junction block, and windowed openings in the front wall expose indices on the levers identifying selected circuits.

Byrne, U.S. Pat. No. 5,096,434, issued Mar. 17, 1992, discloses an electrical interconnection assembly for use in wall panels of a space divider wall system. The system includes junction blocks having several receptacle connectors, so as to provide a plurality of electrical outlets on both sides of a wall panel. The junction block is connected by means of conduits extending from both ends of the junction block to oppositely directed connector blocks for connection to adjoining panels. The assembly of the junction block and connector blocks allows electrical power to be supplied to one end of the panel and conducted to and through the junction block to other panels. The receptacle connectors on the junction block each have one type of terminal configuration, e.g., a female electrical terminal configuration. One of the connector blocks is provided with the identical terminal configuration. The other connector block is provided with a matching terminal configuration, e.g., a male electrical terminal configuration. When two wall panels are joined at their respective edges, the male connector block may be readily connected to the female connector block in the adjacent panel. When two panels are joined to a third panel, all at one point, the arrangement of this invention allows the male connector block to be connected to the female connector block of one of the other two panels, and the male connector of the other of the two panels may be connected to one of the receptacle connectors of the junction block on either of the other two panels, in this manner establishing a three way interconnection arrangement. In a similar fashion, a fourth, or other additional panels may be added to the junction and plug into receptacle outlets of other panels in order to provide an arrangement of panels that is totally interconnected, electrically.

Snodgrass, et al., U.S. Pat. No. 5,164,544, issued Nov. 17, 1992, describes an electrified space dividing panel having a panel member, raceway, modular, or electric system disposed in a raceway and raceway covers for gaining access to the system. The system includes a single terminal block having end and side sockets, with first and second electrical receptacles being respectively removeably engaged with the end socket and the side sockets, such that the first and second electrical receptacles are disposed in horizontally spaced, side-by-side relation and project outwardly for predetermined light dimensions through receptacle openings in one of the raceway covers. The raceway can include a web having an opening which cooperates with a support ear on the first receptacle during engagement of the first receptacle with an end socket, so as to provide additional lateral support for the electrical receptacle when a plug is removed there from.

Kilpatrick, et al., U.S. Pat. No. 5,178,555, discloses a kit which includes a junction box for installation along a raceway. The kit includes a mounting bracket having a first adjustable mounting mechanism for locating the bracket along the raceway. This provides an initial adjustment, and a second adjustable mounting mechanism is provided for securing the junction box to the mounting bracket. This adjustably locates the junction box along the mounting bracket, and provides a second or final adjustment to accurately locate the junction box between two pre-measured lengths of cable.

Byrne, U.S. Pat. No. 5,259,787, issued Nov. 9, 1993, discloses an electrical junction block mounting assembly, which may be utilized for mounting the junction block within a raceway. The assembly includes a cantilever beam formed on an outer wall of the junction block. This beam is provided with a transversely extending channel for engagement with a support structure. The beam is attached to the junction block by means of a resilient hinge section, and is provided with a first arm section extending between the hinge section and the channel, and a second arm section extending beyond the channel. The first arm section has a sloping surface sloping away from the outer channel between the hinge section of the panel. The second armed section has a sloping surface sloping toward the wall beyond the channel. The surfaces will contact a mounting rail or similar structure during installation of the junction block. In this manner, the hinged cantilever beam is deflected until the rail is in alignment with the channel for engagement with the structural support member.

One issue which exists with respect to raceway systems is the problem of having appropriately sized junction blocks and electrical outlet receptacle blocks for raceways of a particular width. With the junction block maintained stationary within a raceway area, the electrical receptacle blocks electrically engaged with the junction blocks will extend laterally outwardly a particular width. However, that width may not be appropriate for raceways of various sizes. However, if different sized junction blocks and/or outlet receptacle blocks are required for raceways of various sizes, a user's inventory may be substantial. It would be advantageous if a single-sized junction block and a single-sized outlet receptacle block could be utilized in a manner so as to accommodate raceway areas of different widths.

BRIEF DESCRIPTION OF THE DRAWINGS

The invention will now be described with reference to the drawings, in which:

FIG. 13 is a perspective and partially exploded view of two single-sided junction blocks, and showing an arrangement for interconnection to a raceway or the like;

FIG. 15 is a perspective and partially exploded view of a multi-positionable raceway in accordance with the invention;

FIG. 16 is a sectional end view of the junction block shown in FIG. 15, taken along section lines 16-16 of FIG. 15;

FIG. 17 is also a sectional, end view of the junction block shown in FIG. 15, taken along section lines 17-17 of FIG. 15;

FIG. 18 is an end view of one end of the outlet receptacle block shown in FIG. 15;

FIG. 19 is a perspective view of the junction block and associated conduit illustrated in FIG. 15, but in a stand alone configuration;

FIG. 20 is a perspective view of the outlet receptacle block shown in FIG. 15, but shown in an opposing direction;

FIG. 27 is an alternative embodiment of a multi-positionable junction block in accordance with the invention, showing a perspective and partially exploded format, with an alternative embodiment of an outlet receptacle block, also in accordance with the invention;

FIG. 28 is a sectional, end view of the junction block shown in FIG. 27, taken along section lines 28-28 of FIG. 27;

FIG. 29 is a further sectional, end view of the junction block shown in FIG. 27, taken along section lines 29-29 of FIG. 27;

FIG. 30 is an end view of one end of the outlet receptacle block shown in FIG. 27;

FIG. 31 is a top, sectional view, illustrating the relative positioning of the blade connectors and terminals within the junction block shown in FIG. 15, and further showing the outlet receptacle block as it may be engaged with the junction block in alternative configurations;

FIG. 32 is a plan view similar to FIG. 31, but showing only the bus bars of the outlet receptacle blocks, and the blade terminals, conductors and connectors associated with one terminal of the junction block;

FIG. 33 is a perspective and partially exploded view of a further embodiment of a multi-positionable junction block and outlet receptacle block in accordance with the invention;

FIG. 34 is a sectional, end view of the junction block shown in FIG. 33, taken along section lines 34-34 of FIG. 33;

FIG. 35 is a further sectional, end view of the junction block shown in FIG. 33, taken along section lines 35-35 of FIG. 33;

FIG. 36 is an end view of one end of the outlet receptacle block shown in FIG. 33;

FIG. 37 is a plan view of one level of circuit terminals, showing the relative interconnections of the outlet receptacle block and the cable connectors to blade connectors within the junction block shown in FIG. 33;

FIG. 38 is a plan view similar to FIG. 37, but showing some of the structural aspects of the outlet receptacle block and the junction block shown in FIG. 33;

FIG. 39 is a perspective and partially exploded view of a still further embodiment of a multi-positional junction block and outlet receptacle block in accordance with the invention, particularly showing the capability of positioning the outlet receptacle block in a selected one of the five interconnecting channels of the junction block;

FIG. 40 is a sectional, end view of the junction block shown in FIG. 39, taken along section lines 40-40 of FIG. 39;

FIG. 41 is a further sectional, end view of the junction block shown in FIG. 39, taken along section lines 41-41 of FIG. 39; and FIG. 42 is a sectional, end view of one end of the outlet receptacle block shown in FIG. 39.

DESCRIPTION OF THE PREFERRED EMBODIMENT

The principles of the invention are disclosed, by way of example, in a raceway configuration with multi-positionable receptacle blocks as illustrated in the several embodiment shown in FIGS. 15-42. These raceway assemblies advantageously provide the capability of electrically engaging an electrical outlet receptacle block in a selected one of a plurality of lateral positions relative to the junction block itself. With the junction block remaining stationary, the invention provides the advantages of varying the lateral position of the outlet receptacle block, so as to accommodate raceways of varying widths in modular wall panels or the like, without requiring either junction blocks or outlet receptacle blocks of varying sizes. In this manner, it is apparent that inventory of a user can be substantially reduced.

For purposes of describing configurations where a raceway assembly in accordance with the invention may be utilized, the following paragraphs describe prior art electrical interconnection assemblies which could be adapted for use within wall panels of a space divider wall system. These assemblies are shown in the prior art drawings of FIGS. 1-14. Specifically, FIGS. 1-8 describe and depict a junction block with several receptacle connectors, so as to accommodate a series of electrical outlets on both sides of a wall panel. The junction block is connected by means of conduits extending from both ends of the junction block to associated connector blocks for connection to adjoining panels. FIGS. 9-14 illustrate what can be characterized as a center-connect single-sided junction block, which is adapted to provide pairs of junction blocks and electrical receptacle block outlets on one or both sides of the raceway, with the connector cables extending through a centerline extending longitudinally along the raceway. Also, FIGS. 9-14 depict an assembly which can utilize pairs of junction blocks on opposing sides of the raceway, in a manner so as to have the connector cables still extending through the central portion of the raceway. Again, these assemblies as shown in FIGS. 1-14 do not comprise any of the principal concepts of the invention.

Figure 1:
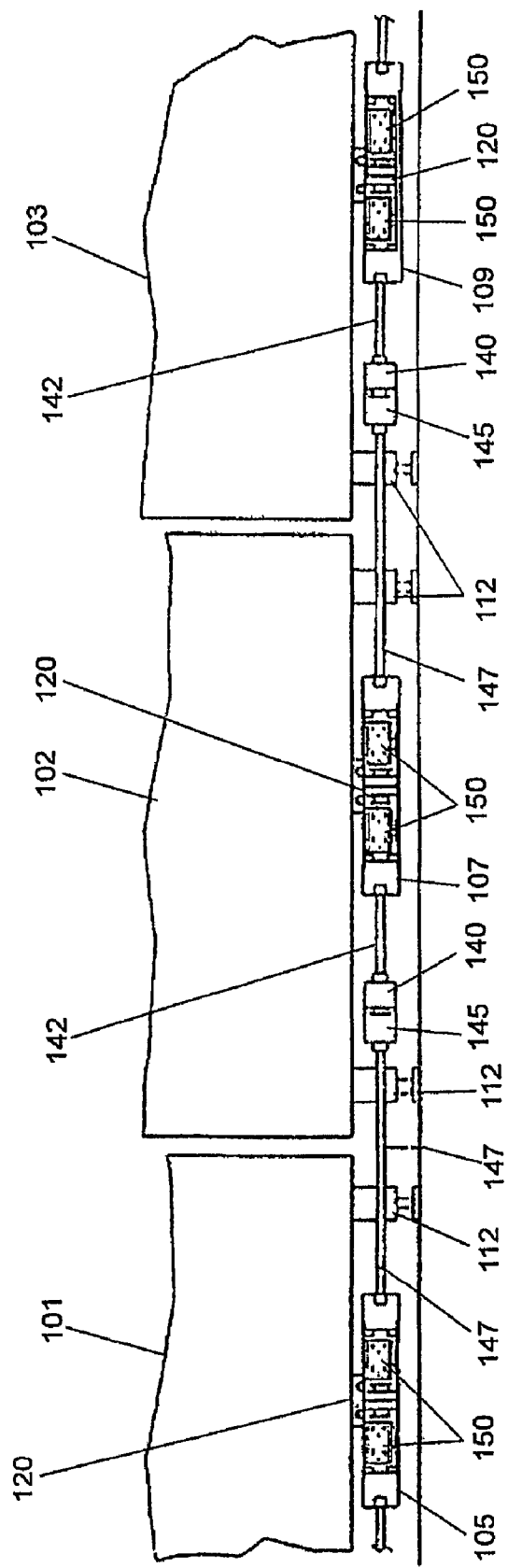
FIG. 1 is a prior art, fragmentary elevation view of a plurality of adjacent wall panels and electrical connection assemblies arranged in the panels.

FIG. 1 is a fragmentary elevational view of adjacent modular wall panels 101, 102, 103 of a rearrangeable wall system. The wall panels are provided with electrical interconnection assemblies 105, 107 and 109 in a raceway area formed along the lower edge of panels 101, 102 and 103. Each of the panels is provided with substantially flat support legs 112 which allow for passage of electrical conduits in the raceway. Raceway covers, customarily used, have been omitted from the drawing in FIG. 1 to better show the electrical junction assemblies. Each of the electrical interconnection assemblies 105, 107, and 109 is provided with a junction block 120, a female electrical connector block 140 and a matching male connector block 145. The connector blocks 140, 145 are connected to associated junction blocks 120 by means of conduit sections 142 and 147, respectively. Each of the junction blocks 120 is shown in FIG. 1 to be provided with a pair of electrical outlet receptacles 150. Junction blocks 120 are double sided and corresponding pairs or outlet receptacles are provided on the opposite side of each of the wall panels 101, 102 and 103 (not shown in the drawing) to allow various electrical equipments to be plugged into the outlets from either side of the panel.

Figure 2:
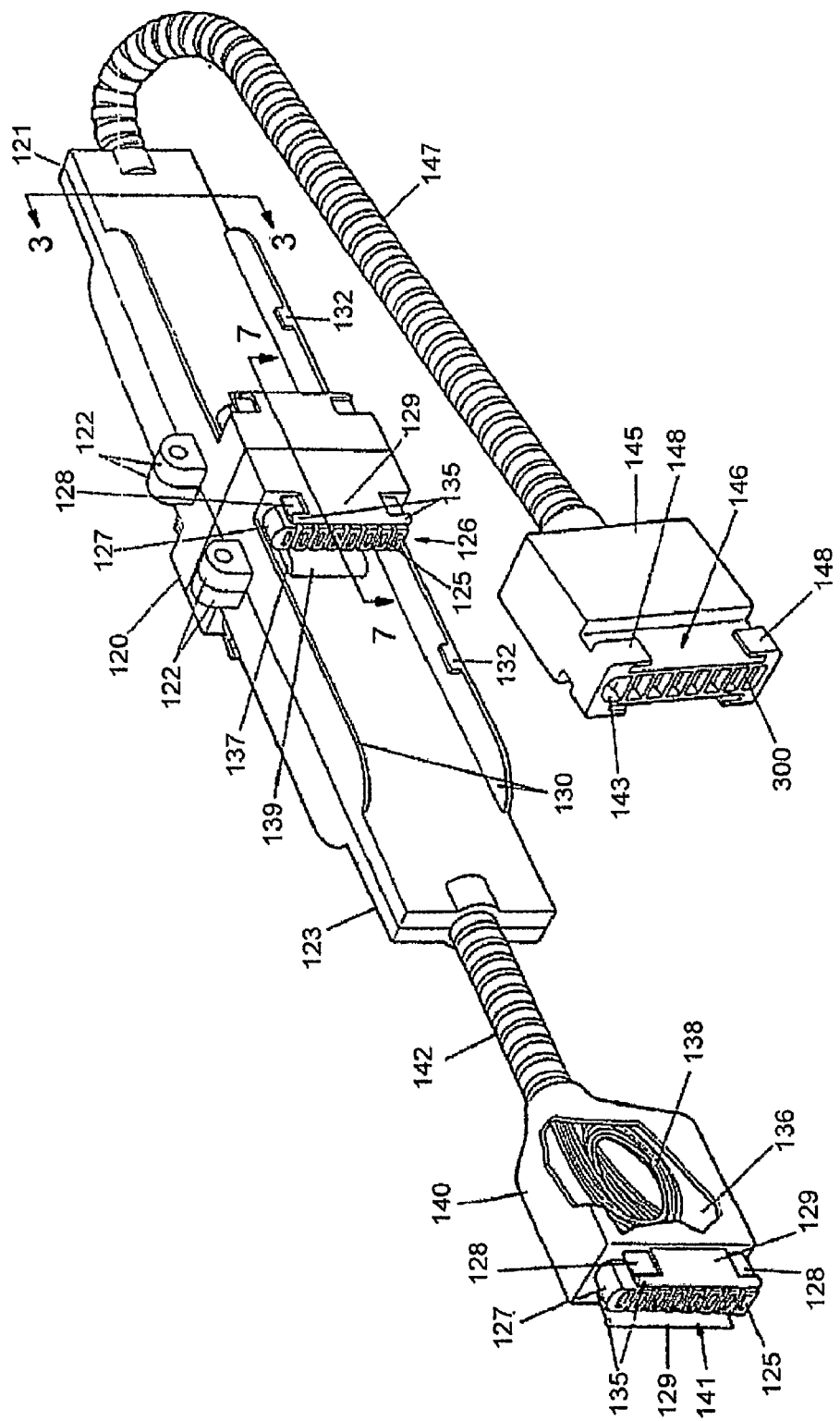
FIG. 2 is a prior art, enlarged perspective view of one of the electrical interconnection assemblies of FIG. 1.

FIG. 2 is an enlarged perspective view of one of the electrical interconnection assemblies, for example assembly 107. The junction block 120 is provided with support lugs 122 by which the junction block is supported by standard fasteners extended through support tables extending from the bottom edge of the wall panel, e.g., wall panel 102. Junction block 120 comprises an elongated housing having opposing ends 121 and 123 and a symmetrical center section comprising four female receptacle connectors 126. Only one of the receptacle connectors 126 is fully exposed in FIG. 2. There is a pair of connectors 126 on each side of the housing and the connection on each side face in opposite directions. Support flanges 130 are provided adjacent each of the female connectors to provide support for electrical outlet receptacles engaged with the connectors 126. In this manner, junction block 120 is adapted to support four electrical outlet receptacles, two on each side of a wall panel to which junction block 120 is attached. The junction block assembly further comprises end connector block 140, provided with a female connector 141, and connected via a standard electrical conduit 142, which may be a flexible conduit, to end 123 of junction block 120. Similarly, connector block 145, provided with a male connector 146 is connected via flexible conduit 147 to end 121 of junction block 120. In a straight line connection arrangement, as depicted for example in FIG. 1, wherein a plurality of panels are positioned adjacent each other, electrical power is transmitted between panels by connection of male connector block 145 to female connector block 140 of the adjacent junction assembly.

Electrical power is transmitted through the junction assembly by means of electrical wires disposed in the conduits 142, 147, terminated on connectors 141 and 146, respectively, and connected to receptacle connectors 126 in junction block 120. Accordingly, electrical power is transmitted through interconnecting panels and is at the same time made available at electrical outlet receptacles in each panel. Conduit 147, provided with the male connector block 145, may be a fixed-length conduit and conduit 142 may be of a length such that female connector block 140 is positioned at substantially the same distance from the panel edge in each panel independent of the width of the panel. Thus, female connector block 140 will always be accessible to male connector block 145 independent of the width of the panels. To accommodate panels of different widths, conduit 142 may be an expandable flexible conduit, such as are well known in the art. In that case, connector block 140 may be provided with an inner spatial area 136, as shown in a partially broken-away view in FIG. 2. The inner spatial area 136 is provided for storage of excess length of electrical wiring 138 in a coiled or other configuration. The excess length of electrical wiring 138 may be withdrawn when conduit 142 is expanded to an extended length. This arrangement is similar to that disclosed in my earlier patent, U.S. Pat. No. 4,579,403 (dated Apr. 1, 1986) and entitled ELECTRICAL JUNCTION ASSEMBLY WITH ADJUSTABLE CONNECTORS.

Figure 4:
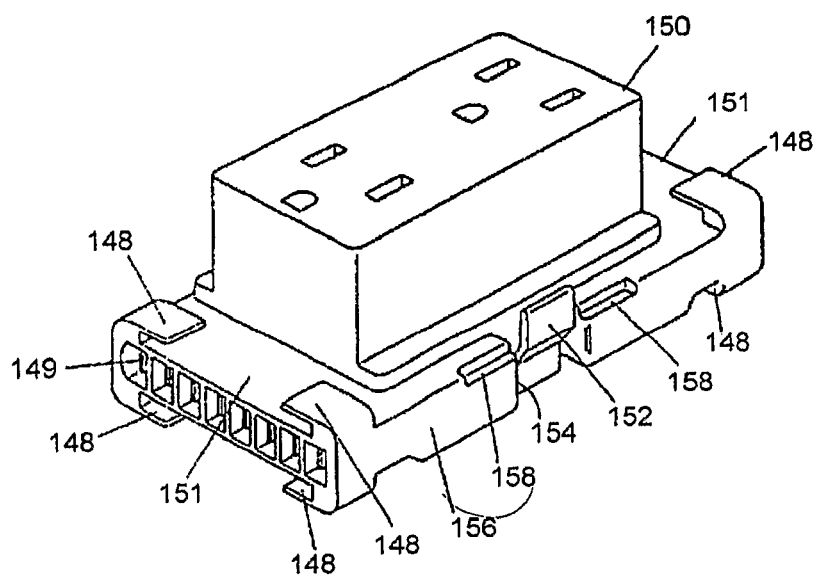
FIG. 4 is a prior art, enlarged perspective view of an outlet receptacle shown in FIG. 1.

The conduit 147 is preferably a flexible conduit which may be bent to accommodate a connection to adjacent panels which are disposed at angular positions with respect to each other, rather than in a straight line. The junction assemblies of this invention readily accommodate an arrangement in which three or more panels are disposed in an intersecting relationship, as will be discussed further herein with respect to FIG. 6. In such a configuration, the male connector block 145 of one of the panels may be connected to one of the female receptacle connectors 126 of a junction block assembly in an adjacent wall panel. For this purpose, the female connector 141 of connector block 140 and female receptacle connectors 126 on junction block 120 have been made identical. Similarly, the male connector 146 on connector block 145 has been made identical to the male connector of electrical outlet receptacle 150, shown in FIG. 1. Greater detail of the receptacle 150 is shown in FIG. 4 and is described below. As may be seen from FIG. 2, the female connectors 126 and 141 are each provided with a pair of side flanges 129 having upper and lower recessed areas 128, for engagement with flanges 148 of a male connector to provide a locking arrangement. FIGS. 129, which are made of a resilient plastic material and formed integral to the housing to which they are connected, are provided with an outwardly extending inclined end surface 135. When surfaces 135 are engaged by flanges such as flanges 148 of connector 146 on connector block 145, the flanges 129 will be deflected inward, allowing flanges 148 of the male connector to engage recesses 128 to provide a locking engagement of the male and the female connectors. A protuberance 137 is provided with a generally rounded edge surface 139 and acts as an entry guide as a male connector is engaged in female connector 126. The female connectors 126, 141 are each provided with a plurality of female connector terminals 125 and a key lug 127. Male connector 146 is provided with a plurality of male connector terminals 149 and an opening 143 for receiving key lug 127.

Figure 5:
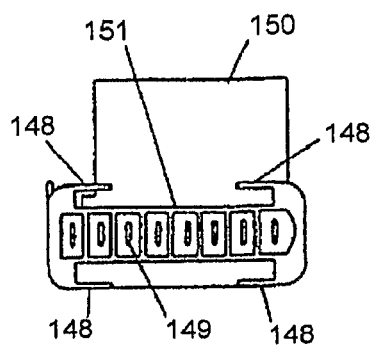
FIG. 5 is a prior art side elevation view of the outlet receptacle of FIG. 4.

The electrical outlet receptacle 150, shown in FIG. 4, is provided with male connectors 151 at both ends, allowing the receptacle to be plugged into any one of the four female receptacle connectors 126 of junction block 120. As shown in FIG. 2, junction block 120 is provided with upper and lower support flanges 130 to support receptacles 150 in each of the four female connectors 126. The lower support flanges 130 are provided with a locking flange 132. The receptacle 150 is provided with a spring latch 152 disposed in recess 154 in the surface 156 of receptacle 150. Surface 156 engages one of the lower support flanges 130 when the receptacle 150 is installed in the junction block 120. The locking flanges 132 will be aligned with the recess 154 when the receptacle 150 is inserted between flanges 130, causing the spring latch 152 to be depressed. The receptacle 150 may then be moved to either the left or to the right to engage one of the female connectors 126. Recesses 158 are provided in receptacle 150 to accommodate locking flange 132 and movement to either the left or to the right by a sufficient distance will cause the spring latch 152 to be moved past locking flange 132, causing the spring latch 152 to return to its extended position. Hence, receptacle 150 will be retained in a locked position. The receptacle may be removed by depressing spring latch 152 and sliding the receptacle 150 to either left or right to align the locking flange 132 with recess 154. FIG. 5 is a right-hand elevation of receptacle 150 showing a right-hand elevation or receptacle 150 showing right-hand male connector 151.

Figure 3:
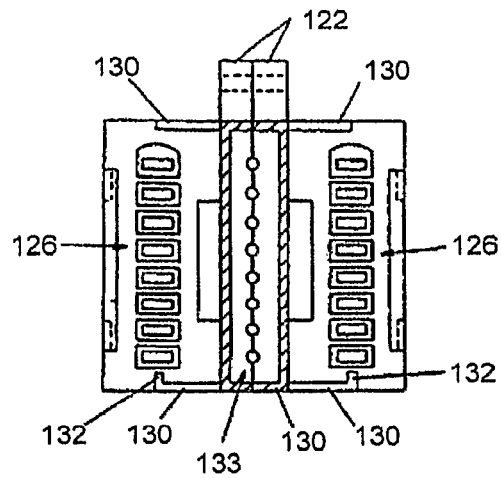
FIG. 3 is a prior art cross-sectional view taken along lines 3-3 of FIG. 2.

FIG. 3 is a cross-sectional view of junction block 120 taken along line 3-3 of FIG. 2. FIG. 3 shows two of the four receptacle connectors 126 of connector block 120. One of the two connectors 126 shown in FIG. 3 is disposed on each side of the central housing section 131, which contains a plurality of wires 133. An eight-wire system is shown in this illustrative embodiment. Each of the male and female connectors are provided with eight separate terminals, and eight separate electrical wires 133 extend through the connector blocks 140, 145, the conduits 142, 147 and the central section 131 of the junction block 120. By way of example, these may include two ground terminal wires, three neutral wires and three positive wires representing three separate circuits, with a shared ground for two of the circuits. Similarly, 10- or 12-wire systems may be readily accommodated, having corresponding number of terminals on each of the connectors and providing a greater number of separate circuits. The four female receptacle connectors 126 are each connected to the wires 133 by means of a plurality of contact blades, described later herein with respect to FIGS. 7 and 8. Each wire, together with the connector block terminals and receptacle connector terminals to which it is connected, is referred to herein as a circuit element. A particular circuit may be selected for use by one of the receptacles 150 by appropriate wiring connections internal to the receptacle. Since all of the circuits are connected to each one of the receptacle connectors 126 of junction block 120, a connector block 145 of an adjacent panel, equipped with a male connector, may be connected to any one of the receptacle connectors 126. In this manner, electrical power may be provided to receptacle connectors to junction block 120 and to associated connector blocks 140, 145 and hence to any adjacent panels to which these connectors may be connected. Similarly, a connector block 145 equipped with a male connector connected to one of the female connectors 126 may receive electrical power for distribution to a panel to which the connector block 145 belongs. Such interconnecting arrangements are described further herein with respect to FIG. 6.

Figure 7:
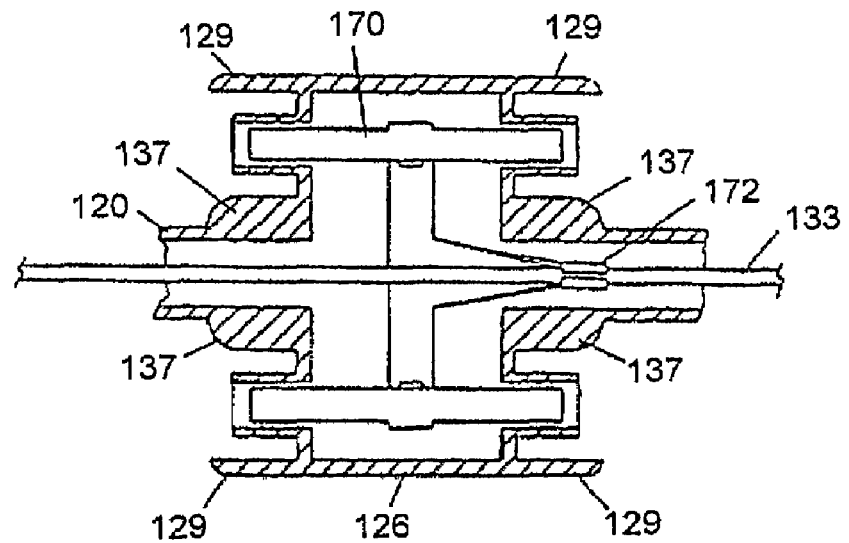
FIG. 7 is a prior art, fragmentary cross-sectional view taken along lines 7-7 of FIG. 2.

FIG. 7 is a fragmentary cross-sectional view along line 7-7 of FIG. 2. Shown in FIG. 7 is a contact blade structure 170 which is one of eight such blades disposed in central housing section 131. Each such blade is in electrical contact with one of the conductors 133. Connection to conductor 133 is made by means of a crimped connection of blade extension member 172 to conductor 133. As may be more readily seen from the perspective view of FIG. 8, the extension member 172 is part of a center section 173 which is connected to left-hand upper and lower contact blades 174 and right-hand upper and lower contact blades 175. The upper and lower contact blades on each side from the female opening part of the conductor 126 for engagement with blades of a male connector.

Figure 6:
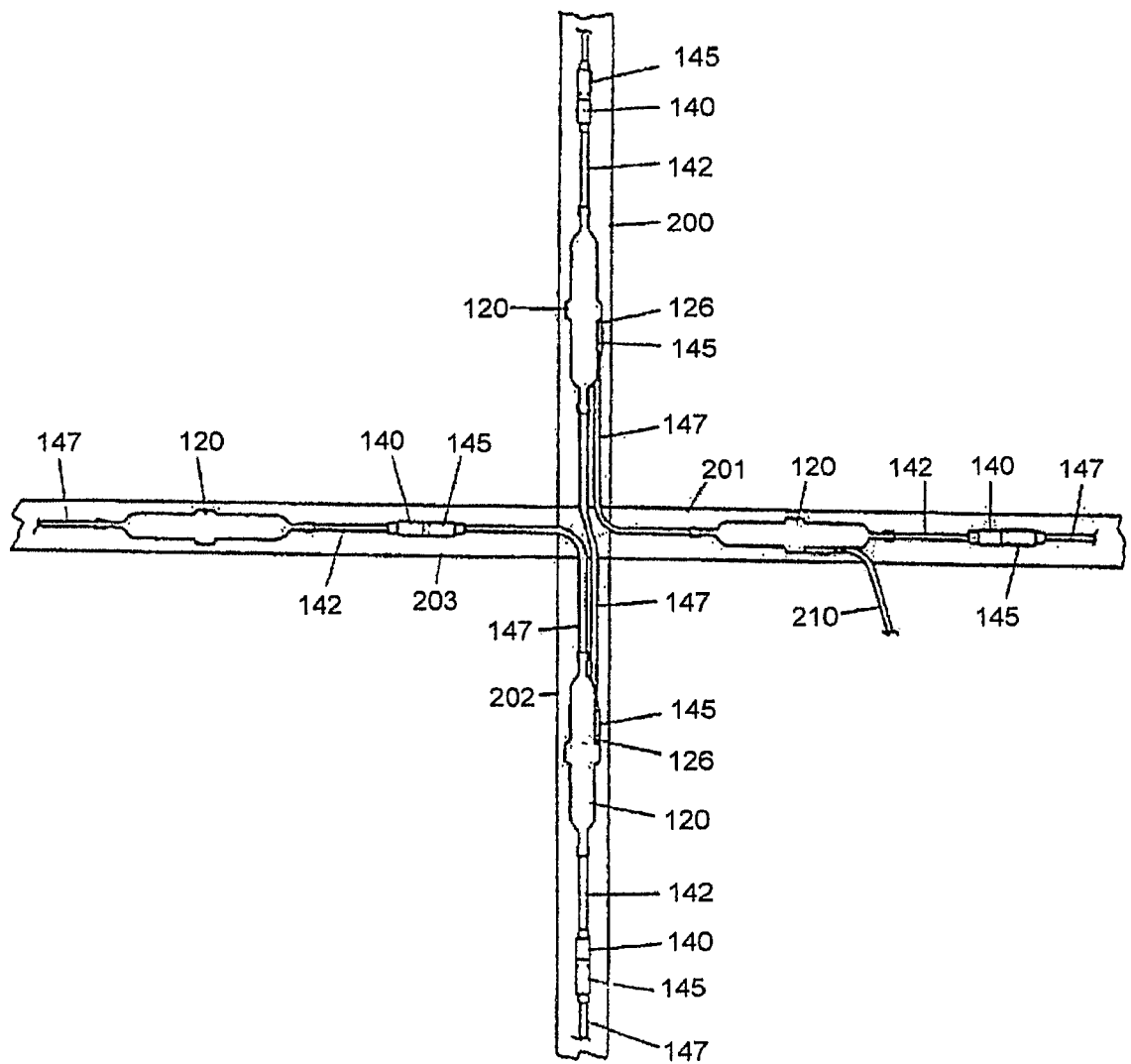
FIG. 6 is a prior art, fragmentary plan view of raceway areas of four wall panels, illustrating wall panel interconnections.

FIG. 6 is a fragmentary plan view of raceway areas of four wall panels illustrating the connections of interconnection assemblies of the invention in a configuration in which the four panels are disposed at right angles to each other. As will be apparent from the following description, the specific angle at which the panels are positioned is not particularly significant. Furthermore, the invention is equally applicable to a three-panel configuration or a five-panel configuration disposed at right angles to each other. Each of the four panels is provided with an interconnection assembly, as shown in FIG. 2, comprising a junction block 120, a male connector block 145, and a female connector block 140 attached to the junction block 120 by means of flexible conduits 147 and 142, respectively. The junction block 120 is disposed within each panel raceway near one edge of the panel. Panels 200, 201, 202 are positioned such that the end at which these panels are joined to other panels is the end near which the junction block 120 is positioned. One of the panels, panel 203, is positioned with an opposite orientation in which the end near which the junction block 120 is located is positioned opposite the point of junction of the four panels. The flexible conduit 147, provided with the male connector block 145, extends beyond the end of the panel in which it is positioned, and the flexible conduit 142, provided with a female connector block 140, is terminated just short of the end of the panel. Thus, as is also shown in FIG. 1, a connection is made between panels by extending the flexible conduit 147 with male connector block 145 into the raceway area of the adjacent panel to engage the female connector block 140 at the end of flexible conduit 142. In the configuration of FIG. 6, the male connector block 145 of panel 202 and its associated flexible conduit 147 extend into the raceway area of panel 202 to engage female connector block 140 of panel 203. It will be apparent that the connection as shown between panel 202 and 203 may be made whenever these panels are adjacent and independent of the angle at which the panels are disposed with respect to each other. In the configuration of FIG. 6, the flexible conduit 147, with its male connector block 145, associated with the panel 200 are extended into the raceway area of panel 202 for engagement with one of the female receptacle connectors 126 of junction block 120 in panel 202. In this manner, an electrical connection is established among the junction blocks of the three panels 200, 202, and 203. Thus, electrical power provided from an external source to any one of these three may be distributed to the other two by means of the connection arrangement shown by way of example in FIG. 6. In the arrangement of FIG. 6, flexible conduit 147 and its male connector block 145 of panel 202 is connected to one of the female connectors 126 of junction block 120 of panel 200 thereby establishing an electrical connection between panels 200 and 201. This connection, in combination with the other connections shown in FIG. 6 and described in the previous sentences, completes an arrangement for establishing an electrical connection from any one of four panels to the entire four-panel configuration. Additional connections may be envisioned by connections of male connectors 145 from other panels into additional ones of the female receptacle connectors 126 of the junction blocks 120 of any of the panels 201 through 203, should one choose to provide an arrangement of more than four intersecting panels. Furthermore, additional conduits, such as conduit 210 shown in FIG. 6, may be connected by means of a male connector to any of the receptacle connectors 126 to provide electrical power to lamps or other fixtures. As can be seen, a great deal of flexibility has been achieved by the electrical junction assembly in accordance with this invention.

Figure 9:
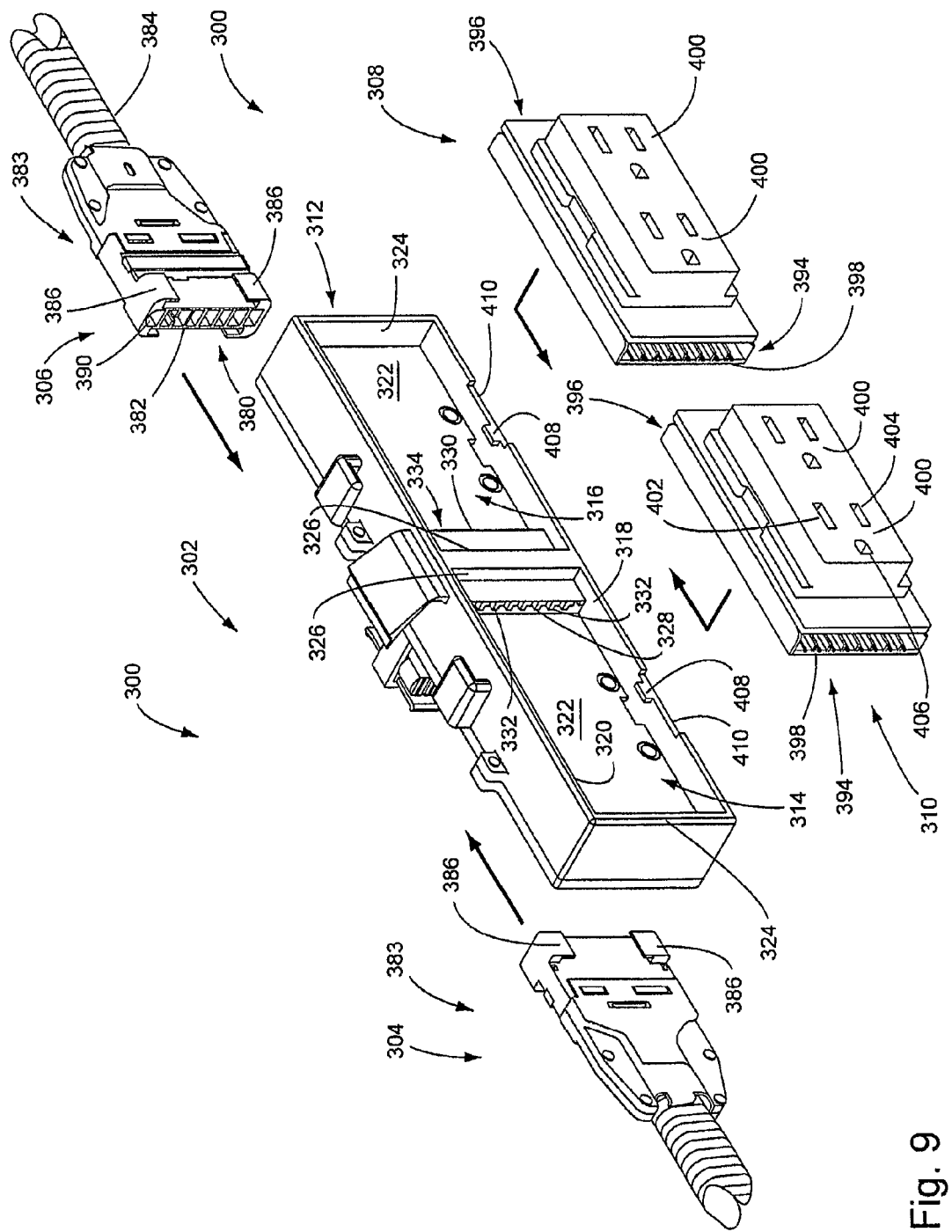
FIG. 9 is a prior art perspective and partially exploded view of a center connect single-sided junction block assembly in accordance with the invention.

The foregoing description was a disclosure of an example prior art system, adapted for use in wall panels of a space divider system. Turning to the specific embodiment in accordance with the invention, the junction block assembly 300 is illustrated in FIGS. 9-14. Turning to FIG. 9, the junction block assembly 300 includes a junction block 302. The junction block 302 is characterized as being "single-sided" in that it provides for interconnection of receptacle blocks only on one side of the junction block 302. As further shown in FIG. 9, the junction block assembly 300 includes a first center connect cable assembly 304 and a second center connect cable assembly 306. The cable assemblies 304, 306 may be identical. As described in greater detail in subsequent paragraphs herein, the first and second center connect cable assemblies 304, 306 are adapted to electrically interconnect to the junction block 302, in a manner so that electrical power received from one of the cable assemblies 304, 306 may be applied to electrical receptacle blocks connected to the junction block 302 and so as to apply power to the other of the center connect cable assemblies 304, 306. As further illustrated in FIG. 9, the junction block assembly 300 includes a first electrical receptacle block 308 and a second electrical receptacle block 310. Each of the receptacle blocks 308, 310 is adapted to be releasably interconnected to the junction block 302 and, correspondingly, to the cable assemblies 304, 306 so that electrical power can be supplied to receptacles associated with the receptacle blocks 308, 310.

Turning specifically to the junction block 302, the block 302 will now be described with respect to FIGS. 9-14. FIG. 13 illustrates a pair of junction blocks 302, and specifically illustrates a side of one of the junction blocks 302 which opposes the side of the junction block 302 viewable in FIG. 9. More specifically, the junction block 302 comprises a housing 312. The housing 312 includes a pair of recessed or spatial areas 314 and 316, referred to herein as the first recessed area 314 and second recessed area 316. As will be described in subsequent paragraphs herein, the recessed areas 314, 316 are adapted to receive, mechanically and electrically, the electrical receptacle blocks 310, 308. Each of the first and second recessed areas 314, 316 is formed by a lower wall 318 and an upper wall 320. Located at the back of each of the recessed areas 314, 316 is a back wall 322. Each of these spatial areas 314, 316 is also formed by an outer side wall 324 and an inner side wall 326.

Figure 10:
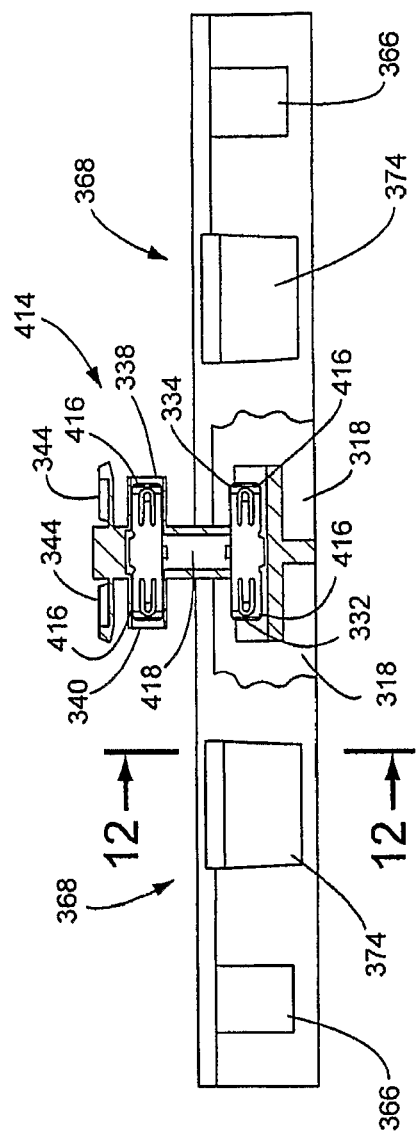
FIG. 10 is a plan view, with a partially cutout portion of the single-sided junction block shown in FIG. 9.

Within the first recessed area 314, a first electrical connector set 328 extends laterally from the inner side wall 326. Correspondingly, an identical second connector set 330 extends laterally outwardly from the inner side wall 326 associated with the second recessed area 316. Each of these connector sets 328, 330 is formed by a series of female connectors 332. The female connectors 332 are formed from individual contact blade structures, somewhat corresponding to the contact blade structure 170 previously described herein with respect to the prior art configurations shown in FIGS. 7 and 8. In the particular configuration illustrated in FIGS. 9-14, each of the connector sets 328, 330 comprises an 8-wire or 8-connector system. That is, eight separate wires are provided. By way of example, these may include two ground terminal connectors, three neutral connectors and three positive connectors representing three separate circuits incoming to the junction block assembly 300. Similarly, 5, 10 or 12-connector systems may be readily accommodated, having corresponding numbers of terminals on each of the connectors and providing for a different number of separate circuits. In addition to the female connectors 332 shown with respect to the first recessed area 314, a further set of female connectors 334 would be associated with the second connector set 330 within the second recessed area 316. An illustration of one of the female connectors 332 and one of the female connectors 334 is shown in FIG. 10.

At the back of the junction block 302 is a pair of center positioned connector sets 336. These connector sets 336 are somewhat similar to the receptacle connectors 126 associated with the prior art system previously described herein. The center position connector sets 336 are referred to herein as a first center position connector set 338 and a second center position connector set 340. Each of these center position connector sets 338, 340 include a set of eight female connectors 342. Each of the center position connector sets 338, 340 is positioned in a straight line relationship relative to the other of the connector sets 338, 340. Referring specifically to FIG. 13, where the first center positioned connector set 338 is shown in relative detail with respect to a second junction block 302, the first center position connector set 338 includes a side flange 344 extending to the side of the female connectors 342. The side flange 344 is provided with upper and lower recessed areas 346. The upper and lower recessed areas 346 are adapted to assist in providing engagement with flanges with one of the first or second center connected cable assemblies 304, 306, respectively. The side flanges 344 are preferably made of a resilient plastic material and formed integral with the housing of the junction block 302 to which they are associated. Preferably, the side flanges 344 are also provided with an outwardly extending inclined end surface 348. When the surfaces 348 are engaged by flanges associated with the cable assemblies 304, 306, the side flanges 344 will be deflected inwardly, allowing flanges of the cable assemblies 304, 306 to engage the recessed areas 346, so as to provide a locking engagement of a center position connector set 366 with a center connect cable assembly 304 or 306.

Each of the junction blocks 302 of the junction block assembly 300 also includes means for releasably coupling the junction block assembly 300 to other structures, including, for example, an upper wall of a raceway within a wall panel or the like. In this regard, reference is made primarily to FIG. 13, illustrating a pair of the junction blocks 302 with a support bracket 350 having the shape and configuration specifically illustrated in FIG. 13. The support bracket 350, as illustrated in FIG. 13, comprises an upper section 358 having a substantially horizontal configuration when installed within a wall panel or the like. Integral with and extending from opposing sides of the upper section 358 are a pair of downwardly turned flanges 360. Extending laterally outwardly from the other opposing sides of the upper section 358, and curve downwardly there from are a pair of integral side arms 362. Integral with each of the side arms 362 and extending outwardly from the lower portions thereof are a pair of laterally extending retaining supports 364.

The support bracket 350 is adapted to be connected to the lower portion of a longitudinally extending support bar 352 as illustrated in FIG. 13. Support bar 352 has a substantially rectangular and hollow configuration. It should be emphasized that various other types of support configurations and supporting components can be utilized in place of the support bar 352. The support bar 352 includes a bottom section 354. Through holes 356 extend through the upper section 358 of the support bracket 350. Corresponding through holes (not shown) would also extend through the bottom 354 of the support bar 352. Connecting means, such as screws or the like (not shown) may be received with in the through holes 356 and the through holes (not shown) of the support bar 352 for purposes of interconnecting the support bracket 350 to the support bar 352.

Returning to the junction blocks 302, each of the junction blocks 302 include a pair of L-shaped mounting lugs 366 located at the top of the junction block 302 and each equally spaced from the center thereof. For purposes of securing each of the junction blocks 302 to the support bracket 350, the ends of the laterally extending retaining supports 364 can be received within a corresponding one of each of the L-shaped mounting lugs 366. This configuration is specifically illustrated in FIG. 14, with respect to one of the junction blocks 302 and a pair of the mounting lugs 366.

As shown primarily in FIGS. 9 and 13, each of the junction blocks 302 further includes what could be characterized as a latching device 368 positioned on the tops of the junction blocks 302 and centered with respect to the longitudinal length of each of the junction blocks 302. With reference to FIGS. 9, 12 and 13, each of the latching devices 368 includes an interlocking latch member 369. The interlocking latch member 369 is provided with an elongated member such as the cantilever beam 372. The cantilever beam 372 is attached to the top of the corresponding junction block 302 by means of a moving hinge 370. The interlocking latching member 369 may be integrally formed on the top of the corresponding junction block 302, and may be constructed of a resilient plastic material, such as polycarbonate which provides a restoring force on the interlocking latch member 369. The cantilever beam 372 includes an upwardly sloping surface 374 which slops upwardly toward the back of the corresponding junction block 302. At the end of the sloping surface 374 is a tab 376. When the support bracket 350 is appropriately mounted in the ends of the retaining supports 364 are received within the L-shaped mounting lugs 366, the cantilever beam 372 moved toward a corresponding downwardly turned flange 360 of the support bracket 350, and the tab 376 engages the flange 360. This configuration is illustrated with respect to one of the junction blocks 302 and one of the latching devices 368 in FIG. 14. When it is desired to disengage a junction block 302 from a support bracket 350, a downwardly projecting force (either by hand, screwdriver or the like) may exerted on the upwardly sloping surface 374, so as to depress the cantilever beam 372. When the cantilever beam 372 is depressed, the tab 376 of the cantilever beam 372 will move below the end of the corresponding downwardly turned flange on the support bracket 350. In this manner, the retaining tab 376 is disengaged from the flange 360. The junction block 302 may then be removed from the L-shaped mounting lugs 366, by pulling the junction block 302 outwardly from the support bracket 350. Specifically, this outward movement of the junction block 302 will cause the mounting lugs 366 to be disengaged from the retaining supports 364 of the support bracket 350. Similarly, the junction block 302 may be installed and releasably interconnected with the support bracket 350 by slidably engaging the L-shaped mounting lugs 366 with the retaining supports 364. This sliding motion will result in engagement of the latching device 368 with the downwardly extending flange 360, thereby causing the tab 376 to be captured by the flange 360. At that point, the restoring force imparted to the latching device 368 due to the resiliency of the interlocking latch member 369 causes engagement of the tab 376 with the flange 360, thereby placing the junction block 302 in a releasably locked position relative to the supporting bracket 350.

Figure 11:
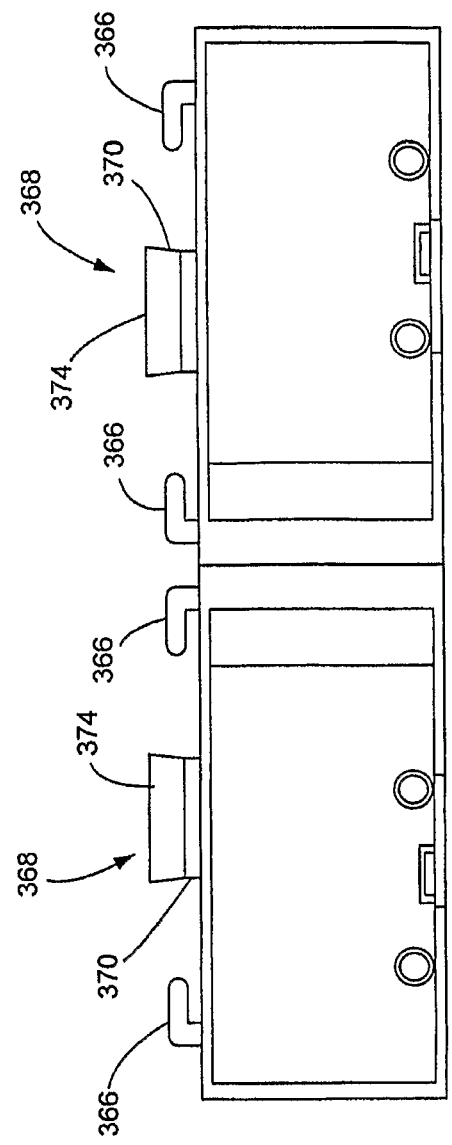
FIG. 11 is a front elevation view of the junction block shown in FIG. 9.
Figure 12:
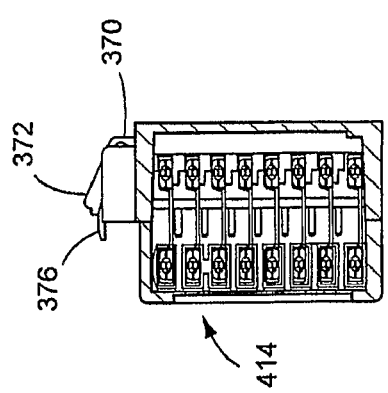
FIG. 12 is a sectional end view of the junction block shown in FIG. 10, taken along section lines of FIG. 10.
Figure 13:
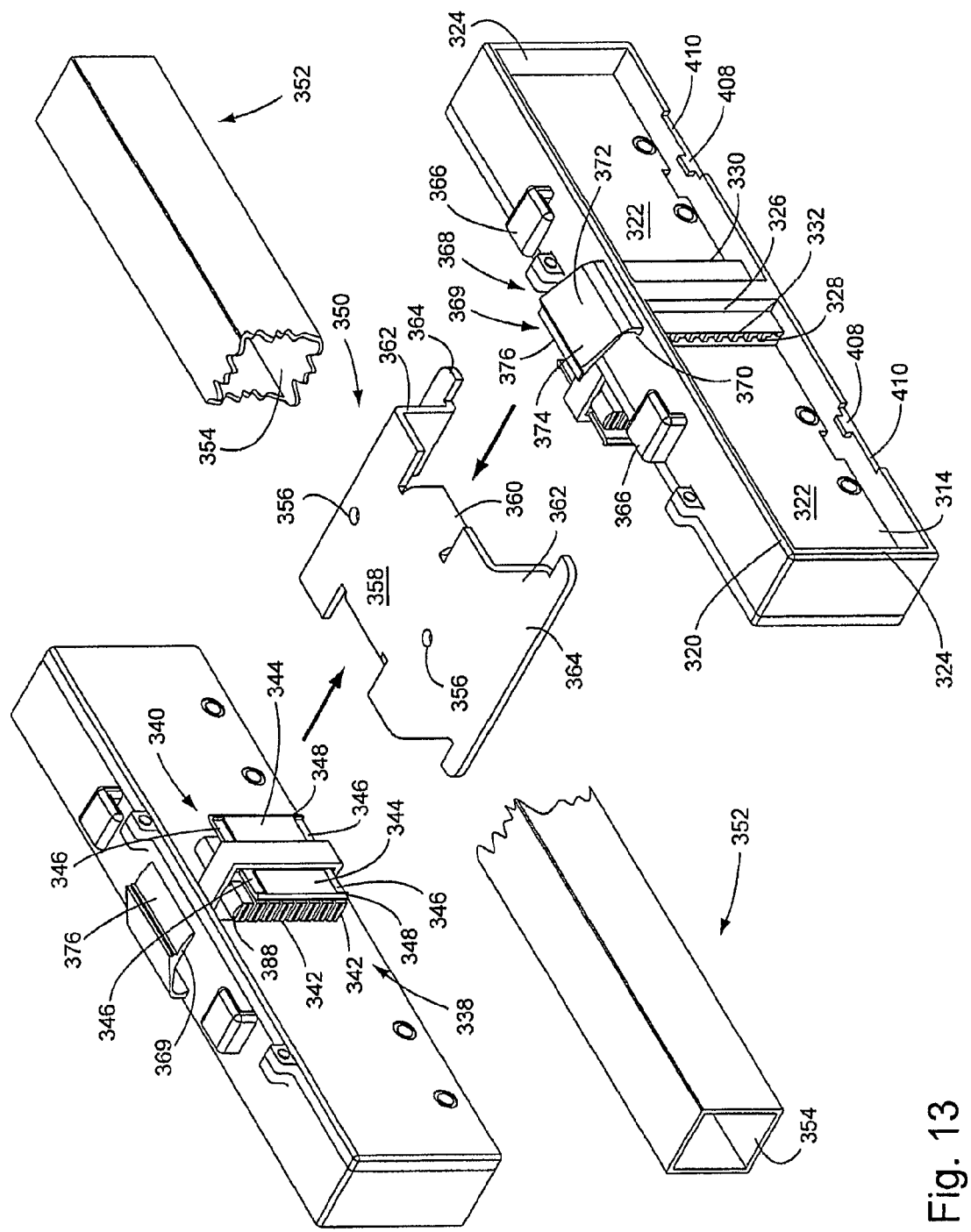
Figure 14:
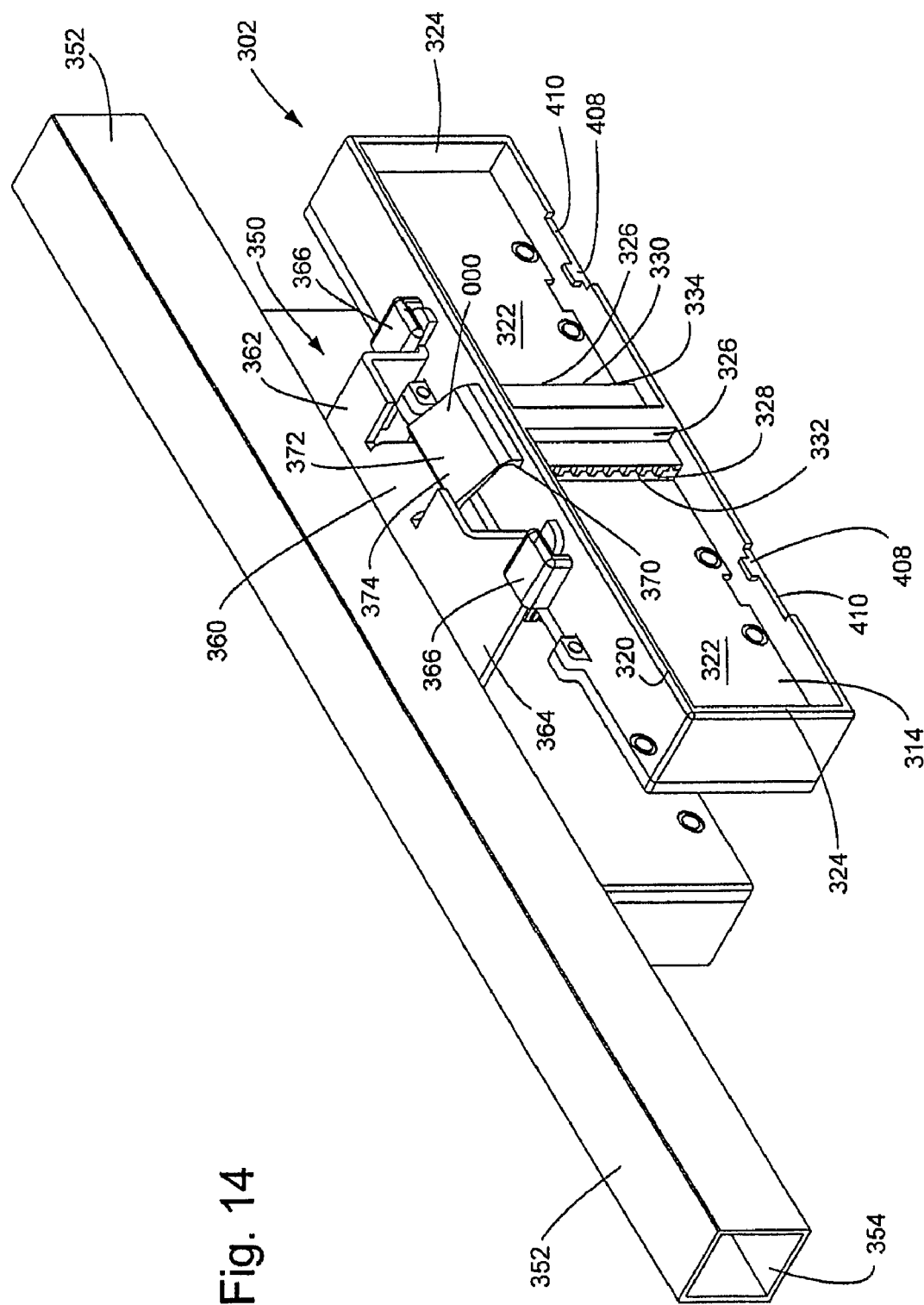
FIG. 14 is a perspective view of the components of the junction block assembly shown in FIG. 13, but shown in a fully assembled state.

A slightly modified embedment of the junction block 302 illustrated in FIGS. 9 and 13 is shown in FIGS. 10, 11 and 12. Therein, the modified junction block 302 is configured so as to be releasably secured to a pair of support brackets 350 (not shown in FIGS. 10, 11 or 12). That is, as specifically shown primarily in FIGS. 10 and 11, the modified junction block 302 includes two pairs of L-shaped mounting lugs 366, with each pair mounted on one side of the top of the junction block 302. Correspondingly, intermediate the mounting lugs 366 of each pair is a latching device 368. Accordingly, the modified junction block 302 includes two latching devices 368. The latching devices 368 and the mounting lugs 366 of the modified junction block 302 shown in FIGS. 10, 11 and 12 operate in exactly the same manner as the mounting lugs 366 and latching device 368 illustrated with respect to the junction blocks 302 illustrated in FIGS. 9 and 13. However, with the configuration shown in FIGS. 10, 11 and 12, one support bracket 350 would be utilized with one latching device 368 and a pair of the mounting lugs 366, while a second support bracket 350 would be utilized with the second latching device 368 and second pair of mounting lugs 366. This configuration could be characterized as providing somewhat greater support for the modified junction block 302, in that two support brackets 350 are utilized to mount the junction block 302 to a support bar 352.

Turning back to the electrical assemblies associated with the junction block assembly 300, the first and second center position connector sets 338, 340, respectively, were previously described herein. For purposes of providing electrical power to the connector sets 338, 340, and for transmitting power through the connector sets 338, 340, the junction block assembly 300 includes a first center connect cable assembly 304 and a second center connect cable assembly 306, as previously referenced herein. Turning primarily to FIG. 9, the first center connect cable assembly 304 is identical to the second center connect cable assembly 306. With respect to each of the cable assemblies 304, 306, each assembly includes a connector block 383 at a terminating end of each of the assemblies 304, 306. Each connector block 383 includes an outwardly extending male connector set 380. Each male connector set 380 includes a series of male connector terminals 382. As previously referenced, the junction block assembly 300 shown in FIG. 9 can be characterized as an "8-wire" assembly. Accordingly, each male connector set 380 would, correspondingly, comprise a set of eight male terminals 382. Electrical power is transmitted to and through the junction block assembly 300 by means of electrical wires (not shown) disposed in an adjustable cable or conduit section 384. The wires (not shown) within the cable or conduit section 384 terminate at the male connector terminals 382 of the corresponding male connector block 383. Although not shown in the drawings, the adjustable cable or conduit section 384 may terminate at its other end in a corresponding male connector block 383 or other electrical assemblies. For example, the other end of either or both adjustable cable or conduit section 384 may terminate in a connector adapted to interconnect directly to cables associated with incoming building supply power or other direct sources of electrical power.

As previously described herein, each of the center positioned connector sets 338, 340 is provided with a side flange 344 having upper and lower recessed areas 346. The upper and lower recessed areas 346 are adapted to assist in providing engagement with flanges 386 of one of the male connector sets 380. In this manner, a releasable locking engagement is provided between a male connector set 380 and a center positioned connector set 338 or 340. As also previously described herein, the side flanges 344 of the center positioned connector sets 338 and 340 are preferably made of a resilient plastic material and formed integral with the housing of the junction block 302 to which they are associated. Preferably, side flanges 344 are also provided with an outwardly extending inclined end surface 348. When the inclined end surfaces 348 are engaged by flanges, such as the flanges 386 of the male connector set 380 on a connector block 383 of a center connect cable assembly 304, 306, the flanges 344 will be deflected inwardly, allowing the flanges 386 of the male connector set 380 to engage the recesses 346, and thereby provide a locking engagement of the center connect cable assembly 304, 306, and a male connector set 380. Preferably, each of the center positioned connector sets 338 and 340 are provided with a key lug 388. Correspondingly, each male connector set 380 is preferably provided with an opening 390 for receiving the corresponding key lug 388. In accordance with the foregoing, the first and second center position connector sets 338, 340, respectively, can be mechanically (in a releasable manner) and electrically interconnected to either of the first center connect cable assembly 304 or the second center connect cable assembly 306.

As earlier described herein, the junction block assembly 300 includes one or more junction blocks 302. Each junction block 302 is adapted to electrically receive a first receptacle block 308 and a second receptacle block 310, as illustrated in FIG. 9. FIG. 9 illustrates prospective views of each of the receptacle blocks 308, 310. In this particular embodiment of receptacle blocks which may be utilized in accordance with the invention, each of the receptacle blocks 308, 310 is provided with a first male connector set 394 extending outwardly from one end of each of the receptacle blocks 308, 310, and an identical second male connector set 396 extending outwardly from an opposing end of each of the receptacle blocks 308, 310. With respect to FIG. 9, the actual terminals of the second male connector set 396 in each of the receptacle blocks 308, 310 is not actually viewable. However, each of the second male connector sets 396 as the exact same configuration as each of the first male connector sets 394. In this regard, providing male connector sets 394, 396 at both ends of the receptacle blocks 308, 310 permits the receptacle blocks 308, 310 to be utilized with a junction block having a configuration such as junction block 302, wherein a first female connector set 328 is located within a first recessed area 314, and a second female connector set 330 is located within the second recessed area 316. That is, with the male connector sets 394, 396 associated with each of the receptacle blocks 308, 310, either of the receptacle blocks 308, 310 can be utilized in either of the recessed areas 314, 316.

As also previously described, the junction block 302 is provided with the open recessed areas 314,316 in which to support the electrical receptacle blocks 308,310. In the same regard, each of the first and second male connector sets 394, 396, include a series of male terminals 398. The male terminals 398 comprise blade terminals. Typically, a receptacle block 308 or 310 would comprise three blade terminals, corresponding to a single circuit to be applied from the blade terminals 398 to the electrical receptacles 400 which extend outwardly from the front of each of the receptacle blocks 308, 310. The electrical receptacles 400 illustrated in FIG. 9 comprise three terminal receptacles, and would include a hot, neutral and ground connection. The receptacles 400 are in the form of female terminals, and are adapted to receive conventional, electrical 3-prong plugs (not shown) electrically connected to devices and appliances to be energized. As an example, each of the electrical receptacles 400 may include a hot terminal 402, neutral terminal 404 and ground terminal 406. Each of these terminals of this receptacle 400 is connected to a different one of the blade terminals 398 associated with the connector sets 394, 396.

The bottom portion of each of the receptacle blocks 308, 310 is not illustrated in FIG. 9. However, these bottom portions may have a latching mechanism substantially similar to the latching mechanism previously described herein with respect to the prior art receptacle block 150. That is, with reference to the junction block 302, the recessed area 314 is provided, on its lower wall 318, with a slightly recessed locking flange 408. Correspondingly, the recessed area 316 associated with the junction block 302 also includes on the lower wall 318, a substantially identical locking flange 408. However, as illustrated in FIG. 9, the locking flange 408 associated with the recessed area 314 is positioned to one side of an indentation 410 in the lower wall 318, while the locking flange 408 associated with the recessed area 316 is positioned to an opposing side of an indentation in the lower wall 318 of the recessed area 316.

Although not specifically shown in FIG. 9, but as previously described with respect to the receptacle block 150 associated with the prior art system illustrated in FIGS. 4 and 5, the lower portion of each of the receptacle blocks 308, 310 is provided with a spring latch (not shown) disposed within a recess (not shown) on an underside of each of the receptacle blocks 308, 310. Each of the receptacle blocks 308, 310 can be inserted into the recessed areas 314, 316 of the junction block 302. With the configuration shown in the exploded view of FIG. 9, the first receptacle block 308 can be inserted into the second recessed area 316 so that the electrical receptacles 400 face outwardly from the spatial area 316 illustrated in FIG. 9. When inserted, the locking flange 408 will cause the spring latch (not shown) of the receptacle block 308 to be depressed. The receptacle block 308, with the partial recessed area 316 shown in FIG. 9, may be inserted into the recessed are 316 and then be moved to the left (in the view shown in FIG. 9) so that the male terminals 398 of the first male connector set 394 are electrically engaged with the second connector set 330 having female connectors 334 within the recessed area 316. Further, the receptacle block 308 will also include recesses (not shown) so as to accommodate the locking flange 408. Movement to the left of the receptacle block 308 by a sufficient distance will cause the spring latch (not shown) to be moved passed the locking flange 408, thereby causing the spring latch to return to its extended position. In this manner, the receptacle 308 is physically maintained in a locked but releasable position. The receptacle 308 may be removed from electrical connection with the female receptacle block 330 by depressing the spring latch (not shown) and sliding the receptacle 308 to the right so as to align the locking flange 408 with the recessed area of the receptacle block 308. With this configuration, the receptacle block 308 may be removed from the recessed are a316.

Correspondingly, the receptacle block 310 may be physically moved into engagement within the recessed area 314, and then slid to the right so that the male connector set 396 will electrically engage the female connector set 328 associated with the recessed area 314, the recessed area 314 has a locking flange 410, which functionally corresponds to locking flange 408 previously described with respect to recessed area 316. Also, the receptacle block 310, like the receptacle block 308, will include a spring latch (not shown) disposed within a recess (not shown) in a lower surface of the receptacle block 310. The functional and mechanical operation of engaging and disengaging the receptacle block 310 from the junction block 302 corresponds to the same operations as previously described with respect to receptacle block 308 and the junction block 302. Accordingly, the same will not be repeated herein.

Figure 8:
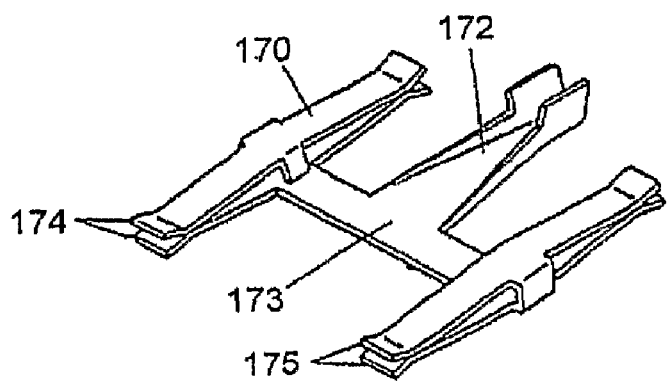
FIG. 8 is a prior art, perspective view of a receptacle contact blade shown in FIG. 7.

As previously described herein, each of the junction blocks 302 includes a first center position connector set 338 and a second center positioned connector set 340. These connector sets are primarily shown in FIG. 13. As also previously described, the connector sets 338, 340 are adapted to electrically engage the male connector sets 380 associated with each of the cable assemblies 304, 306. It should be emphasized that a continuous electrical path exists between the female connectors 342 associated with the first center position connector set 338 and the female connectors 342 associated with the second center position connector set 340. Correspondingly, as also previously described, each of the junction blocks 302 includes a first female connector set 328 associated with the recessed area 314, and a second female connector set 330 associated with the recessed area 316. The female connectors 332 associated with the first female connector set 328 are in a continuous electrical path with the corresponding female connectors 334 associated with the second female connector set 330. Still further, there is a continuous electrical path between connectors associated with the first center position connector set 338, second center position connector set 340, first female connector set 328 and second female connector set 330. This configuration can be achieved through the use of what can be characterized as an H-shaped connector used with respect to each of the eight terminals associated with the female connector sets coupled to each of the junction blocks 302. One of the H-terminals is illustrated in substantial part in FIGS. 10 and 12, and is referred to therein as H-connector 414. As apparent with an 8-wire system, eight of the H-connectors 414 would be utilized. A connector somewhat corresponding to the H-connector 414 was previously described herein with respect to the prior art illustrations of FIGS. 7 and 8, and was referred to as a contact blade structure 170. With reference to FIGS. 7 and 8, and further with reference to FIGS. 10 and 12, each of the H-connectors 414 associated with the junction block 302 in accordance with the invention would substantially correspond to one of the contact blade structures 170 illustrated with respect to FIGS. 7 and 8, but with the contact blade structure 170 having the blade extension member 172 removed. In the prior art configuration illustrated in FIGS. 7 and 8, the blade extension member 172 is utilized to connect to a conductor by means of a crimped connection. As illustrated in FIGS. 10 and 12, each of the H-connectors 414 includes a series of four contact blade sets 416 each of the contact blade sets 416 includes upper and lower contact blades as substantially shown as contact blades 174 and 175 in prior art FIG. 8. As shown expressly in FIG. 10, the contact blade sets 416 form an H-shaped configuration. A common conductor 418 extends between all four of the contact blade sets 416, and provides an electrically conducted path there between. Again, it should be emphasized that with an 8-wire system, eight of the H-connectors 414 would be utilized, and would essentially be stacked as illustrated in FIG. 12. As further illustrated in FIG. 10, one arm of each of the H-connectors 414 would correspond to the female terminals associated with the second center position connector set 340. Correspondingly, an opposing arm would correspond to the female connectors of the first center position connector set 338. Still further, and positioned within the recessed area 314, one set of arms of the H-connectors 414 would correspond to the first female connector set 328. Correspondingly, the remaining arm of each of the H-connectors 414 would correspond to a female terminal of the second female connector set 330.

In accordance with all of the foregoing, an assembly of the junction block assembly 300 will now be described, with respect to essentially all of the FIGS. 9-14. In accordance with the prior discussion, a pair of the junction blocks 302 can be mechanically assembled to a support bracket 350 as shown in FIG. 13. As also shown in FIG. 13, the support bracket 350 can then be connected to a support bar 352. The support bar 352 may be an upper portion of a supporting structure for a raceway or the like. If desired, two of the junction blocks 302 can be connected to the support bracket 350, at opposing ends thereof.

After such connection, the first center connect cable assembly 304 can be electrically and mechanically connected to the second center position connector set 340. Correspondingly, the second center connect cable assembly 306 can be mechanically and electrically connected to the first center position connector set 338. With these connections, I am assuming that electrical power is being transferred from either the first center connect cable assembly 304 or the second center connect cable assembly 306, electrical power is thereby supplied to both the first female connector set 328 within the recessed area 314 of junction block 302, and the second female connector set 330 located within the recessed area 316 of the junction blocks 302. As previously described, in the particular embodiment illustrated herein, each of the connector sets 328, 330 may comprise eight female connectors, representing three separate circuits, with each circuit having a hot, neutral and ground connection. Following this assembly, one or more of the first receptacle block 308 and/or second receptacle block 310 may be electrically engaged with the connector sets 328,330 of the junction block 302. In the particular configuration illustrated in FIG. 9, a second male connector set 396 associated with the second receptacle block 310 would be electrically engaged with the first connector set 328 within the recessed area 314. Correspondingly, the first receptacle block 308, having a first male connector set 394, would be electrically engaged to the second connector set 330 within the recessed area 316 of junction block 302. As also previously described, the first and second male connector sets 394, 396, respectively, would have three "active" male terminals 398 associated with each connector set. These three terminals 398 would be located so that they would electrically engage with one hot, one neutral and one ground connector of either the first connector set 328 or the second connector set 330. In this manner, a selected one of the three available circuits would be provided as electrical power to each of the electrical receptacles 400 associated with the receptacle blocks 308, 310.

With the foregoing configuration, a junction block has been provided with two electrical receptacle blocks, so as to provide a total of four electrical receptacles 400 associated with the junction block 302. Correspondingly, and with primary importance in accordance with the invention, the junction block 302 is adapted so as to provide for a "center connect" of electrical power from center connect cable assemblies 304, 306 to the junction block 302. This center connect type of configuration is particularly useful in certain situations where the junction blocks 302 and the raceways into which the junction blocks 302 may be installed have particular relative sizes and configuration.

As earlier described, it is advantageous to provide for a raceway system which can accommodate raceways of varying widths, without necessarily changing the structures of the junction blocks or electrical receptacle blocks. One such raceway system is illustrated as raceway system 500, with raceway system 500 and various embodiments thereof being described with respect to FIGS. 15-42 in subsequent paragraphs herein. With reference first to FIG. 15, a raceway system 500 includes a junction block 502 having a housing 503. A cable assembly 504 is attached to one end of the junction block housing 503. The cable assembly 504 includes a cable connector 506 utilized to structurally secure the cable assembly 504 to the junction block housing 503 by any suitable and well known means. The cable connector 506 is attached to a conduit 508. The conduit 508 may hold a plurality of electrical conductors, depending upon the number of conductors and electrical circuits utilized with the particular raceway system 500. The conduit 508 may be flexible in design. Also, for purposes of accommodating distance requirements between and among junction blocks, the conduits 508 utilized with the raceway system 500 may be adjustable and comprise expandable, flexible conduit. For purposes of providing such adjustability, end connector blocks (not shown) may be provided with an inner spatial area. The inner spatial area can be provided for storage of excess length of electrical wiring in a coiled or other similar configuration. This type of arrangement is illustrated with respect to the end connector block 140 as previously described herein and illustrated in FIG. 2. Similar types of arrangements are disclosed in my earlier patents, U.S. Pat. No. 5,096,434 issued Mar. 17, 1992 and U.S. Pat. No. 4,579,403 issued May 1, 1986.

Turning again to the junction block 502, the block 502 includes female connector block pairs 510 extending outwardly from the opposing end of the junction block 502. Each of the female connector block pairs 510 includes a female connector set 512. Each of the female connector sets 512 of each female connector pair 510 is provided with a side flange 514 having upper and lower recessed areas 516. The upper and lower recessed areas 516 are adapted to assist in providing engagement with cable assemblies (not shown) which may be structurally and electrically attached to the female connector block pairs 510.

The upper and lower recessed areas 516 of the female connector block pairs 510 are adapted to assist in providing engagement with flanges of a male or end connector block (not shown) associated with a cable assembly. In this manner, a releasable locking engagement can be provided between a female connector set 512 and male connector terminals (not shown) of a male or end connector block. The side flanges 514 may be made of a resilient plastic material and formed integral with the housing of the junction block 502 which they are associated.

Figure 21:
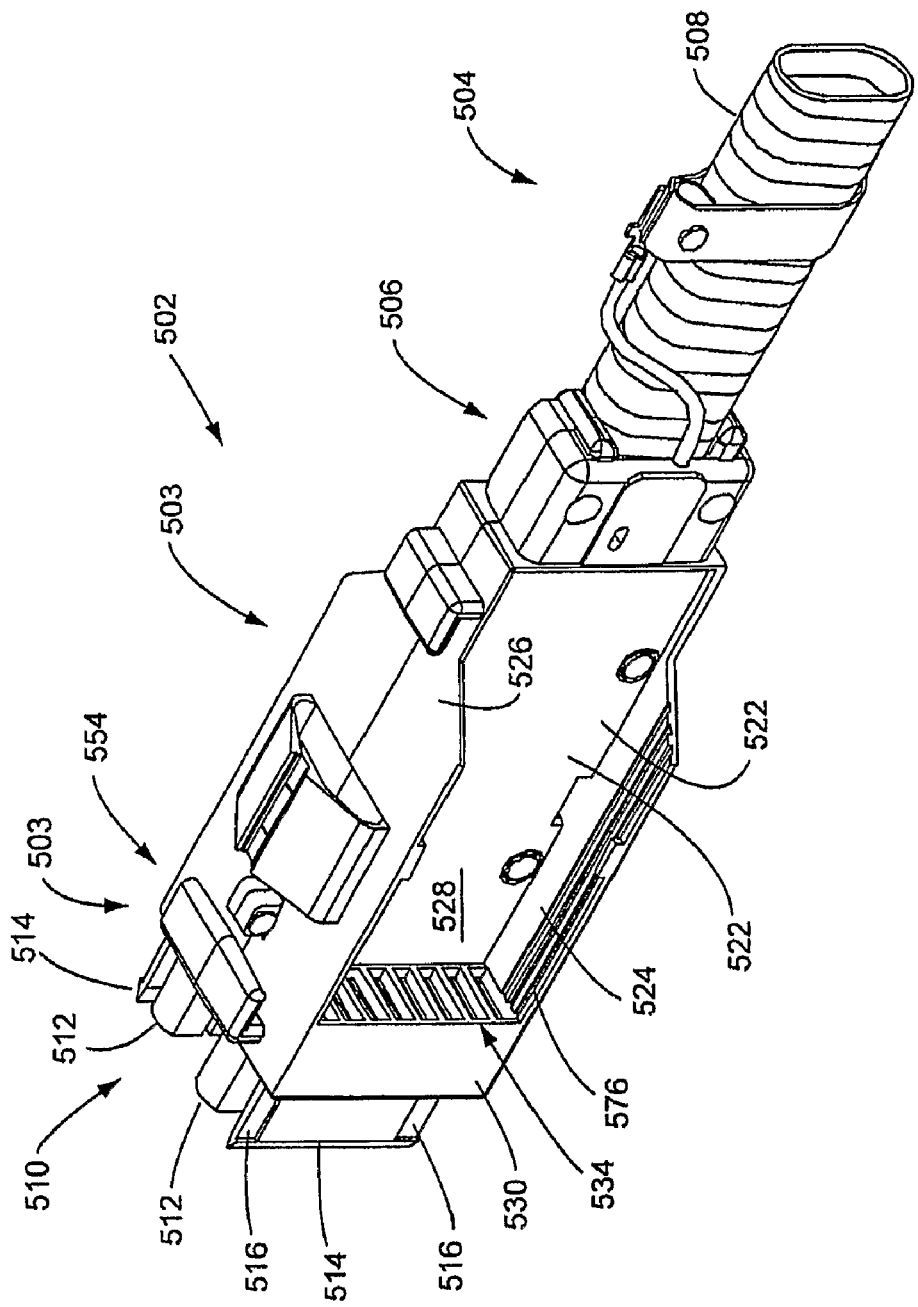
FIG. 21 is a perspective view of the junction block and conduit shown in FIG. 15, but shown from a reverse angle.

Preferably, the side flanges 514 are also provided with an outwardly extending inclined end surface. When these surfaces are engaged by flanges of male connectors, the side flanges 514 will be deflected inwardly, allowing flanges of the male connector to engage the recessed areas 516, thereby providing a releasable locking engagement of the male and female connectors. Preferably, each of the female connector sets 512 is provided with a plurality of female connector terminals 538 and a key lug 540. Concepts associated with such configurations are disclosed and illustrated in FIGS. 2 and 3, and further disclosed in my U.S. Pat. No. 5,096,434 issued Mar. 17, 1992 and entitled ELECTRICAL INTERCONNECTION ASSEMBLY. Turning again specifically to the junction block 502, FIG. 15 illustrates one side of the junction block 502 while FIG. 21 illustrates an opposing side of the junction block 502. The junction block 502 comprises the housing 503, which includes a pair of recessed areas 520, 522 on opposing sides of the junction block 502. As described in subsequent paragraphs herein, and is apparent from prior description of the prior art assemblies illustrated herein, the recessed areas 520, 522 are adapted to receive, mechanically and electrically, the electrical receptacle block 542, which will be described in subsequent paragraphs herein. Each of the recessed areas 520, 522 is formed by a lower wall 524 and an upper wall 526. Located at the back of each of the recessed areas 520, 522 is a back wall 528. Each of these spatial areas 520, 522 is also formed by a side wall 530.

Within the first recessed area 520, a first electrical connector set 532 extends longitudinally outwardly from the side wall 530. Correspondingly, an identical second connector set 534 extends longitudinally outwardly from the side wall 530 associated with the second recessed area 522. Each of these connector sets 532, 534 is formed by a series of vertically disposed "half-H" terminals 536, primarily illustrated in FIGS. 22, 23 and 24. As shown therein, each of the terminals 536 includes a pair of longitudinally extending female terminals 544. These female terminals 544 extend outwardly and form the female connector sets 512 previously described herein, which are part of the female connector block pairs 510. Electrically connected to the female terminals 544 is a blade terminal 546 which extends laterally and perpendicular to each of the pair of female terminals 544. The blade terminals 546 (only one of which is shown in each of FIGS. 22, 23 and 24) form both the first connector set 532 and the second connector set 534 associated with the junction block 502. In this manner, the connector sets 532, 534 are electrically connected to each other, since each is formed by the same blade terminal 546.

Figure 22:
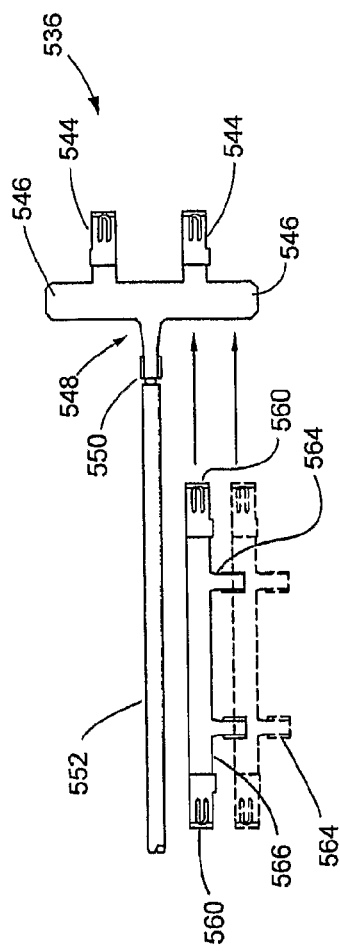
FIG. 22 illustrates the relative position of one bus bar with female connectors of the outlet receptacle block shown in FIG. 15, as it may be positioned onto a male blade of the junction block.
Figure 23:
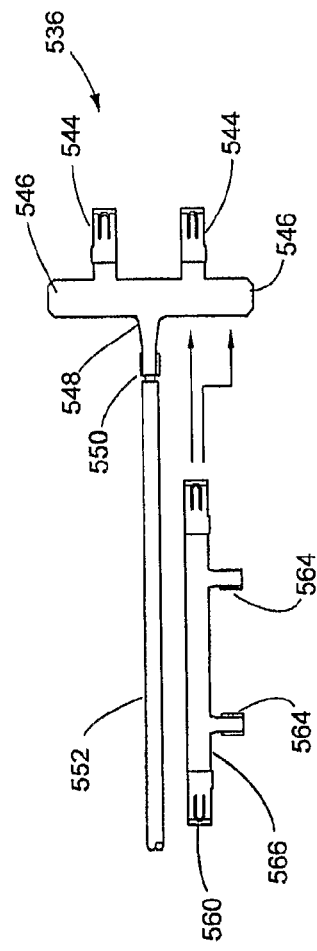
FIG. 23 is a view similar to FIG. 22, but without showing the second position of the bus bar of the outlet receptacle block.
Figure 24:
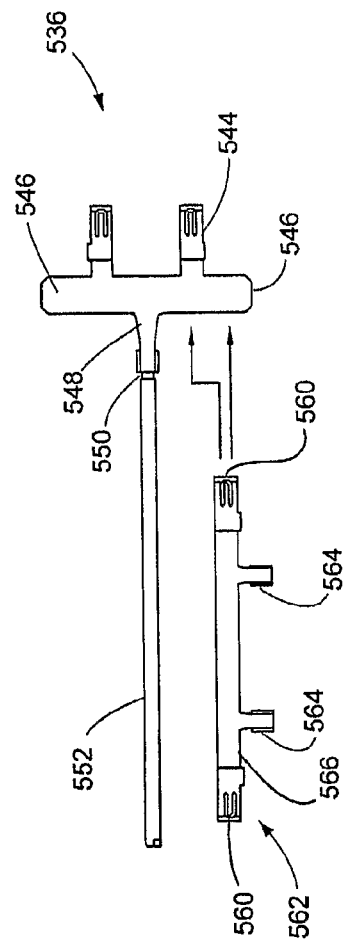
FIG. 24 is a view similar to FIG. 23, but showing the bus bar of the outlet receptacle block in its second, alternative position.
Figure 25:
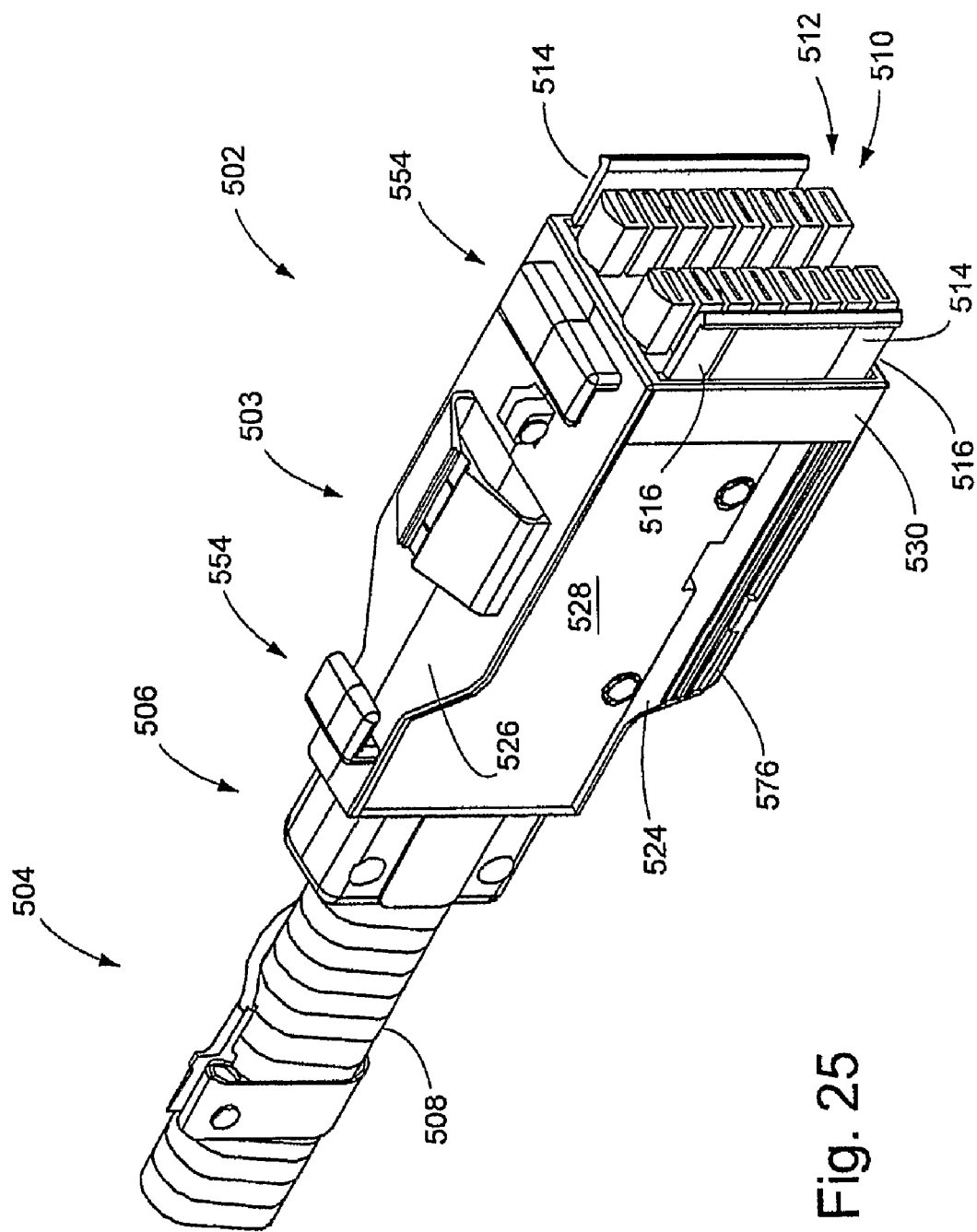
FIG. 25 is a perspective view of the junction block and conduit shown in FIG. 19, but shown from an alternative angle.
Figure 26:
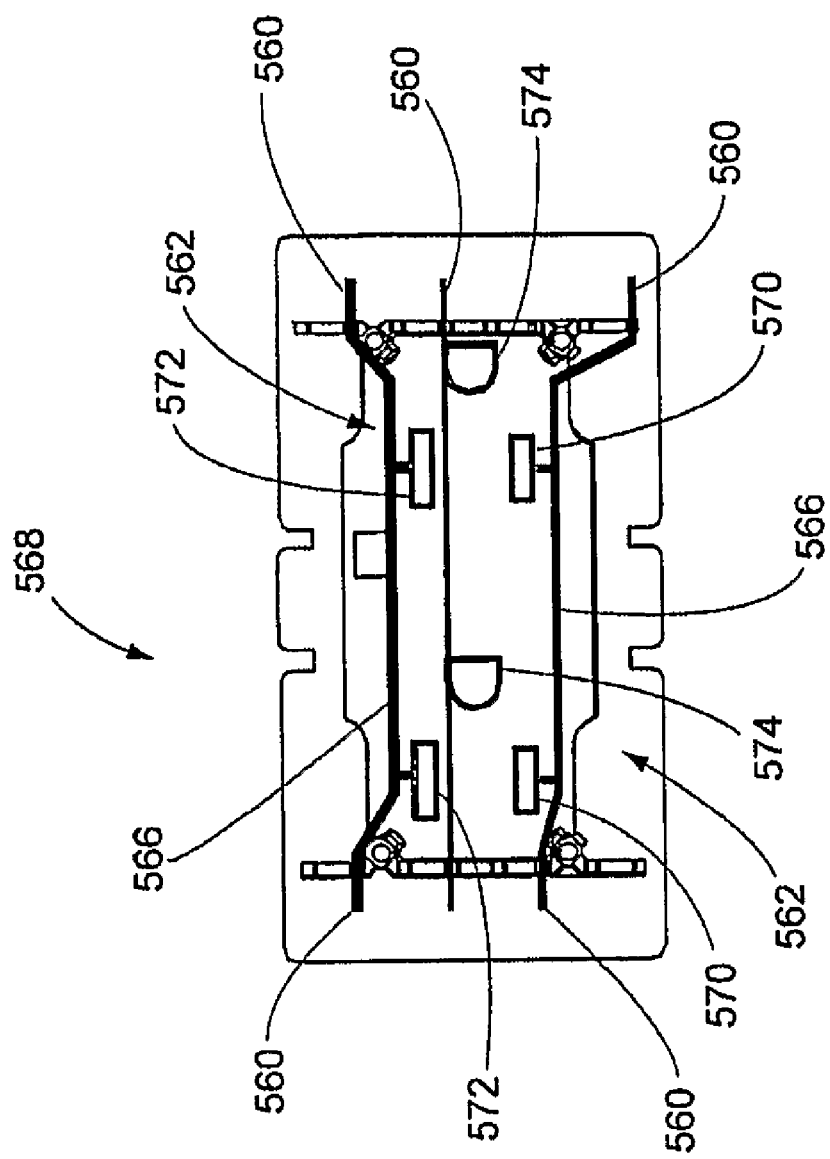
FIG. 26 is a side, sectional view of an outlet receptacle block which may utilized as a receptacle block shown in FIG. 15, and showing the bus bars and terminal arrangements for electrical interconnection to one particular circuit.

As further shown in FIGS. 22, 23 and 24, a rear terminal 548 extends rearwardly from the blade terminal 546. The rear terminal 548 extends rearwardly and includes a crimp assembly 550. The crimp assembly 550 is utilized to electrically connect the half-H terminal 536 to an electrical conductor 552. The electrical conductor 552 extends from the rear terminal 548 through the cable connector 506 and into the conduit 508. In this manner, the conductors 552 may be used in substitution of any bus bar assemblies or similar assemblies which may exist in conventional junction blocks. It is apparent that this saves on costs associated with metal utilized within the junction block 502.

Each of the blade terminals 546 is vertically disposed relative to other blade terminals 546 within the junction block 502, and is held in place by conventional means. In the particular configurations illustrated in FIGS. 15-42, the connector sets utilized therein comprise 8-wire or 8-connector systems. That is, eight separate conductors 552 are utilized, so as to provide 8 terminals. By way of example, these may include two ground terminal conductors, three neutral conductors and three positive conductors, representing three separate circuits incoming to the raceway system 500. Similarly, five, ten or twelve-connector systems may be readily accommodated, having corresponding numbers of terminals on each of the connectors and providing for a different number of circuits. Terminals such as the half-H terminals 536 have been previously illustrated herein and described with respect to FIGS. 7 and 8, although the terminals shown in FIGS. 7 and 8 typically are characterized as "full" H-terminals.

The junction block 502 of the raceway assembly 500 also includes means for releasably coupling the junction block 502 to other structures including, for example, an upper wall of a raceway within a wall panel or the like. In this regard, with reference to FIGS. 15 and 19, the junction block 502 includes a pair of L-shaped mounting lugs 554 located at the top of the junction block 502, and each equally spaced from the center thereof. The L-shaped mounting lugs 554 can be utilized to secure the junction block 502 to a support bracket (not shown) which could correspond to the support bracket 350 previously described herein with respect to FIG. 13. The interconnecting configuration is specifically illustrated in FIG. 14, with respect to one of the previously described junction blocks 302 and pair of mounting lugs 366.

As primarily shown in FIGS. 15 and 19, the junction block 502 further includes what can be characterized as a latching device 556 positioned at the top of the junction block 502 and centered with respect to the longitudinal length of the junction block 502. The latching device 556 can be utilized to secure the junction block 502 to a support bracket (not shown) or a similar structure for interconnection of the junction block 502 to the raceway of a wall panel or the like. Various types of latching mechanisms may be utilized for the latching device 556. One such latching mechanism is disclosed in my U.S. Pat. No. 5,259,787 issued Nov. 9, 1993 and entitled LATCHING MECHANISM. Latching devices are also disclosed in my U.S. Pat. No. 4,993,576 issued Feb. 19, 1991.

The following paragraphs will now describe the electrical receptacle block 542. It should be emphasized that the receptacle block 542 can be similar in structure and function to the electrical receptacle blocks 308, 310 previously described herein and illustrated in FIG. 9. The electrical receptacle block 542 is structured as primarily shown in FIGS. 15 and 18, and includes a pair of opposing female connector sets 558. The female connector sets 558 include a series of female terminals 560. These terminals 560 and female connector sets 558 are formed through a series of vertically disposed receptacle terminal assemblies 562 located within the receptacle block 542. These receptacle terminal assemblies 562 are illustrated primarily in FIGS. 22, 23 and 24. As shown therein, the receptacle block 542 includes what can be characterized as an elongated bus bar 566. The female terminals 560 are formed at the opposing ends of the bus bar 566. Extending perpendicularly from the bus bar 566 are a pair of female receptacle terminals 564. These terminals will be associated with either a hot, neutral or ground terminal of a three-prong receptacle 568, as described in subsequent paragraphs herein.

Typically, the receptacle block 542, for a 8-wire system, would comprise three of the receptacle terminal assemblies 562, corresponding to a single circuit to be applied from the first or second connector sets 532, 534 to the electrical receptacle block 542. With respect to the electrical receptacle block 542, an external face 567 includes a pair of electrical receptacles 568 as illustrated in FIG. 15. The electrical receptacles 568 each include three terminal receptacles, namely hot, neutral and ground connections. The receptacles 568 are in the form of female terminals, and correspond to the female receptacle terminals 564 previously described herein with respect to FIGS. 22-24. As an example, each of the electrical receptacles 568 may include a hot terminal 570, neutral terminal 572 and ground terminal 574. Each of these terminals of each receptacle 568 is associated with a different one of the receptacle terminal assemblies 562.

Concepts associated with some of the principal concepts of the raceway system 500 in connection with the invention will now be described. With reference first to FIGS. 15-18, and as specifically shown in FIG. 15, the lower wall 524 on each side of the junction block 502 includes a series of lower receptacle channels 576. In the particular embodiment shown in FIG. 15, three lower receptacle channels 576 are illustrated. Correspondingly, directly above the lower receptacle channels 576 are a series of corresponding upper receptacle channels 578. As with the lower receptacle channels 576, the upper receptacle channels 578 are three in number. As shown in FIG. 17, the lower receptacle channels 576 and upper receptacle channels 578 exist on both sides of the junction block 502.

With reference primarily to FIG. 18, and as illustrated therein, the electrical receptacle block 542 includes a lower tab 580 which extends longitudinally along the entire bottom portion of the receptacle block 542. Correspondingly, as also illustrated in FIG. 15 and FIG. 18, an upper tab 582 extends longitudinally along the entire upper portion of the receptacle block 542. In accordance with the invention, the lower tab 580 is adapted to selectively engage one of the lower receptacle channels 576 of the junction block 502. Correspondingly, the upper tab 582 is adapted to engage one of the upper receptacle channels 578 on the upper wall 526 of the junction block 502. The particular pair of channels 576, 578 chosen by a user will cause the receptacle block 542 to be adjusted in dimensions regarding how far laterally outwardly the receptacle block 542 extends, relative to the junction block 502. In this manner, in accordance with the invention, the "effective" width of the raceway assembly 500 can be selectively adjusted, using only a single size of junction block 502 and electrical receptacle block 542.

The general concept of this configuration is illustrated in FIGS. 22, 23 and 24. Therein, one of the receptacle terminals 562 associated with the receptacle block 542 is shown in various positions. For example, if the receptacle block 542 is engaged in an inner set of channels 576, 578, the receptacle terminal assembly 562 will be in the position shown in solid line format in FIG. 22. In this manner, the receptacle block 542 can be moved toward the "right" (as viewed in FIG. 15) so that the female connector set 558 on one side of the block 542 can electrically engage the first connector set 532 associated with the junction block 502. This engagement corresponds to the engagement of one of the female terminals 560 of the receptacle terminal assembly 562 with the blade terminal 546 associated with the half-H terminal 536. FIG. 23 illustrates the relative configuration of a receptacle terminal assembly 562 when the receptacle block 542 is selectively engaged with the middle set of receptacle channels 576, 578. Correspondingly, FIG. 24 illustrates the relative position of a receptacle terminal assembly 562 of the receptacle block 542, when the receptacle block 542 has its tabs 580, 582 respectively engaged with the outermost receptacle channels 576, 578.

FIGS. 27-30 illustrate a second raceway assembly 600 which is somewhat similar to the raceway assembly 500. Accordingly, elements of raceway assembly 600 similar in structure and function to like elements of raceway assembly 500 include reference numerals corresponding to those of the like elements in the raceway assembly 500. With reference first to FIG. 27, the raceway assembly 600 includes a junction block 602. The junction block 602 includes a first connector set 604 which comprises a series of female terminals 606. In this case, the female terminals 606, as illustrated in FIGS. 31 and 32, are part of a half-H terminal 608 which is somewhat different in structural configuration from the half-H terminal 536 previously described herein. More specifically, the half-H terminal 608 includes a pair of outwardly extending female terminals 610. These outwardly extending female terminals 610 correspond to the female terminals of the female connector sets 512. These female terminals 610 are connected to a perpendicularly extending common terminal blade 613. The blade 613 is electrically connected to the pair of rearwardly extending female terminal 606. The female terminals 606 may extend rearwardly into the recessed areas 520, 522, so as to be accessible to an electrical receptacle block. It should be noted that in this particular configuration, the terminals made accessible to the electrical receptacle block are female terminals 606, rather than the blade terminal 546. As with the previously described half-H terminal 536, a rear terminal 548 is electrically connected to the female terminal 606 and 610, and includes a crimp assembly 550 at the end of the rear terminal 548. The crimp assembly 550 is utilized to connect the rear terminal 548 to the conductors 552, which extend though the junction block 602 and into the conduit 508.

The raceway assembly 600 includes an electrical receptacle block 612. The receptacle block 612 includes a number of structures and components similar to those of the receptacle block 542, and such elements are numbered identically to those corresponding elements of block 542. However, the receptacle block 612 is relatively wider than the receptacle block 542, and includes receptacle terminal assemblies 614 having a configuration different than the receptacle terminal assembly 562 previously described herein with respect to the receptacle block 542. Also, the receptacle block 612 may include a set of receptacles 568 only on one side of the block 612. With respect to the receptacle terminal assemblies 614, each includes a pair of receptacle terminals which are perpendicularly configured and located at the terminating ends of elongated bus bar 618. In this instance, unlike the receptacle block 542, the receptacle terminal 616 are male terminals. With the configuration illustrated in FIGS. 27-32, the receptacle block 612 can again be located in any one of three channels 576, 578. However, unlike the raceway system 500, the connector terminals 606 associated with the junction block 602 are in the form of female terminals. Correspondingly, the receptacle terminal assembly 614 associated with the receptacle block 612 includes a set of male terminals, rather than the female terminal 560 associated with the receptacle block 542.

FIGS. 33-38 illustrate a further raceway system 650. As with the raceway system 600, some of the elements of the raceway system 650 are similar in structure and function to elements of the raceway system 500. Such elements of the raceway system 650 are numbered identically to the corresponding elements of raceway system 500.

Turning to FIGS. 33-38, the raceway system 650 includes a junction block 652 having a structure which is substantially different from those of the junction block 602 and the junction block 502. In the junction block 652, the block has an H-shaped configuration, with an upper wall 654 and lower wall 656. A series of back walls 658 also exist as illustrated in FIG. 33. These walls form a set of four recessed areas 660. The recessed areas 660 are adapted to electrically and structurally receive the receptacle block 542. For use with the raceway system 600, a cable assembly 662 can be employed. The cable assembly 662 has a cable connector 664 and a pair of flexible conduits 666. Two connector set pairs are employed, with each having a series of eight female terminals 668. As illustrated in FIGS. 37 and 38, the female terminals 668 are conventional in design and connect to a series of conductors 670 through a crimp assembly 671.

As primarily shown in FIGS. 37 and 38, each of the female terminals 668 can be electrically and releasably connected to a common blade terminal 672. The common blade terminal 672 can be rectangular in configuration, and is adapted to electrically and releasably receive female terminals 668 from the cable assembly 662. These can be received from either of two opposing directions relative to the junction block 652.

The electrical receptacle block used with the raceway system 650 can correspond completely in structure and function to the previously described receptacle block 542 used with the raceway system 500. With reference to FIGS. 37 and 38, the receptacle block 542 includes opposing receptacle connector sets 558. As shown in FIGS. 37 and 38, the receptacle connector sets 558 comprise receptacle terminal assemblies 674 having opposing female terminals 676 at the ends thereof, with an elongated bus bar 678 extending longitudinally through the receptacle block 542. With this configuration, female terminals 676 exist at the opposing ends of the elongated bus bar 678. When the receptacle block 542 is engaged within one of these sets of channels 576, 578, and electrically engaged with the common blade terminal 672, electrical connections are made between the receptacles 568 and the conductors 670 running through the conduits 666. Again, it is noted that with the raceway system 650, a substantial amount of metal is saved, relative to other raceway systems adding the same functional capabilities.

A further raceway system in accordance with the invention is illustrated as raceway system 700 in FIGS. 39-42. In this particular configuration, a junction block 702 is provided. The junction block 702 is substantially similar to the previously described junction block 502. However, instead of having a set of three channels 576, 578, the junction block 702 includes a series of five lower channels 704 and a corresponding series of five upper channels 706. The raceway system 700 also includes a receptacle block 708. The receptacle block 708 substantially corresponds to the receptacle block 542 previously illustrated in FIG. 15 and described herein. However, unlike receptacle block 542, the receptacle block 708 has a series of receptacles 568 only on one side of the block 708. The absence of receptacles on the opposing side of the receptacle block 708 is to accommodate the receptacle block 708 when it is engaged in the innermost channels 704, 706 of the receptacle block 702. Also for purposes of accommodating the five channels 704, 706, it can be seen from FIG. 42 that the upper tab 710 and lower tab 712 are offset from a center line of the receptacle block 708. This is to permit the upper tab 710 to be engaged with the innermost upper channel 706, and the lower tab 712 to be engaged with the innermost lower channel 704. With respect to male and female connectors and terminals, the receptacle block 708 could include male terminals, while the connector set 532 could include female terminals. However, if desired, the connector set 532 could include male terminals, while the receptacle block 708 could include female terminals.

In accordance with the foregoing, raceway systems have been described which accommodate raceways of varying widths, without requiring differing sizes and configurations of junction blocks and electrical receptacle blocks.

It will be apparent to those skilled in the pertinent arts that still other embodiments of raceway assemblies in accordance with the invention can be designed. That is the principles of a raceway assembly in accordance with the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

The invention claimed is:

1. A raceway system for carrying electrical power and for providing electrical devices external to said raceway system with access to said electrical power, said system comprising:
at least one junction block having a housing;
a first cable assembly;
cable connector means for connecting said first cable assembly to one end of said junction block housing;
a pair of connector blocks extending outwardly from an opposing end of said junction block housing, with each of said connector blocks having a connector set, and with each of said connector blocks being adapted to selectively engage second cable assemblies so that said second cable assemblies are structurally and electrically attached to said connector blocks;
said junction block housing having a first recessed area located on a first lateral side of said junction block, said first recessed area being formed by a lower wall, an upper wall, a back wall and a side wall;
a first electrical connector set extending longitudinally outwardly from said side wall;
at least one electrical receptacle block, said electrical receptacle block having a first receptacle block connector set;
said lower wall on said first lateral side of said junction block having a plurality of lower receptacle channels;
said upper wall of said first lateral side of said junction block having a plurality of upper receptacle channels, with said lower receptacle channels being aligned with said upper receptacle channels; and
said electrical receptacle block comprising engaging means for selectively engaging one of said lower receptacle channels and one of said upper receptacle channels at a given time, said selective engagement of said engaging means with said lower receptacle channels and said upper receptacle channels being determinative of the extension of said first receptacle block laterally outward from said junction block.

* * * * *